(12) United States Patent
Perski et al.

(10) Patent No.: US 8,228,311 B2
(45) Date of Patent: *Jul. 24, 2012

(54) TOUCH DETECTION FOR A DIGITIZER

(75) Inventors: Haim Perski, Hod-HaSharon (IL); Meir Morag, Savyon (IL)

(73) Assignee: N-trig Ltd., Kfar-Saba (IL)

( * ) Notice: Subject to any disclaimer, the term of this patent is extended or adjusted under 35 U.S.C. 154(b) by 998 days.

This patent is subject to a terminal disclaimer.

(21) Appl. No.: 12/153,343

(22) Filed: May 16, 2008

(65) Prior Publication Data

US 2008/0218494 A1    Sep. 11, 2008

Related U.S. Application Data

(60) Continuation of application No. 11/727,301, filed on Mar. 26, 2007, now Pat. No. 7,843,439, which is a division of application No. 10/757,489, filed on Jan. 15, 2004, now Pat. No. 7,372,455.

(60) Provisional application No. 60/446,808, filed on Feb. 10, 2003, provisional application No. 60/501,484, filed on Sep. 5, 2003.

(51) Int. Cl.
*G06F 3/045* (2006.01)

(52) U.S. Cl. ........................ 345/174; 345/173

(58) Field of Classification Search .......... 345/156–173; 178/18.01–18.03
See application file for complete search history.

(56) References Cited

U.S. PATENT DOCUMENTS

| | | | |
|---|---|---|---|
| 3,572,345 A | 3/1971 | Auphan | |
| 3,587,567 A | 6/1971 | Schiff | |
| 3,651,805 A | 3/1972 | Brelling | |
| 3,942,536 A | 3/1976 | Mirowski et al. | |
| 3,944,740 A | 3/1976 | Murase et al. | |
| 3,952,750 A | 4/1976 | Mirowski et al. | |
| 4,030,509 A | 6/1977 | Heilman et al. | |
| 4,106,494 A | 8/1978 | McEachern | |
| 4,164,216 A | 8/1979 | Person | |
| 4,184,493 A | 1/1980 | Langer et al. | |
| 4,202,340 A | 5/1980 | Langer et al. | |
| 4,223,678 A | 9/1980 | Langer et al. | |
| 4,237,895 A | 12/1980 | Johnson | |
| 4,273,114 A | 6/1981 | Berkalow et al. | |
| 4,293,734 A | 10/1981 | Pepper, Jr. | |
| 4,312,354 A | 1/1982 | Walters | |
| 4,316,472 A | 2/1982 | Mirowski et al. | |

(Continued)

FOREIGN PATENT DOCUMENTS

EP    0148687    7/1985

(Continued)

OTHER PUBLICATIONS

Response to Communication Pursuant to Article 94(3) Dated Mar. 4, 2009 From the European Patent Office Re. Application No. 04702401.3.

(Continued)

*Primary Examiner* — Nitin Patel

(57) ABSTRACT

A detector for detecting touches of at least one object on a transparent sensor located over a display screen, the detector comprising. a display screen; a patterned arrangement of conductors extending into said sensor situated over said display screen; and detection circuitry adapted to detect capacitive coupling of said at least one object with said at least one conductor.

29 Claims, 18 Drawing Sheets

U.S. PATENT DOCUMENTS

| | | | |
|---|---|---|---|
| 4,384,585 A | 5/1983 | Zipes | |
| 4,387,717 A | 6/1983 | Brownlee et al. | |
| 4,403,614 A | 9/1983 | Engle et al. | |
| 4,407,288 A | 10/1983 | Langer et al. | |
| 4,440,172 A | 4/1984 | Langer | |
| 4,492,819 A * | 1/1985 | Rodgers et al. | 178/18.05 |
| 4,506,680 A | 3/1985 | Stokes | |
| 4,543,956 A | 10/1985 | Herscovici | |
| 4,550,221 A | 10/1985 | Mabusth | |
| 4,554,922 A | 11/1985 | Prystowsky et al. | |
| 4,566,456 A | 1/1986 | Koning et al. | |
| 4,572,191 A | 2/1986 | Mirowski et al. | |
| 4,628,934 A | 12/1986 | Pohndorf et al. | |
| 4,639,720 A | 1/1987 | Rympalski et al. | |
| 4,651,716 A | 3/1987 | Forester et al. | |
| 4,674,508 A | 6/1987 | DeCote | |
| 4,679,572 A | 7/1987 | Baker | |
| 4,686,332 A | 8/1987 | Greanias et al. | |
| 4,690,155 A | 9/1987 | Hess | |
| 4,726,279 A | 2/1988 | Kepler et al. | |
| 4,726,379 A | 2/1988 | Altman et al. | |
| 4,765,341 A | 8/1988 | Mower et al. | |
| 4,771,276 A * | 9/1988 | Parks | 345/173 |
| 4,830,006 A | 5/1989 | Haluska et al. | |
| 4,878,553 A | 11/1989 | Yamanami et al. | |
| 4,914,624 A | 4/1990 | Dunthorn et al. | |
| 4,928,688 A | 5/1990 | Mower | |
| 4,979,507 A | 12/1990 | Heinz et al. | |
| 4,988,837 A | 1/1991 | Murakami et al. | |
| 4,998,531 A | 3/1991 | Bocchi et al. | |
| 5,003,976 A | 4/1991 | Alt | |
| 5,020,544 A | 6/1991 | Dahl et al. | |
| 5,022,396 A | 6/1991 | Watanabe | |
| 5,044,375 A | 9/1991 | Bach et al. | |
| 5,083,564 A | 1/1992 | Scherlag | |
| 5,087,243 A | 2/1992 | Avitall | |
| 5,097,843 A | 3/1992 | Soukup et al. | |
| 5,111,815 A | 5/1992 | Mower | |
| 5,129,394 A | 7/1992 | Mehra | |
| 5,137,021 A | 8/1992 | Wayne et al. | |
| 5,156,147 A | 10/1992 | Warren et al. | |
| 5,156,149 A | 10/1992 | Hudrlik | |
| 5,161,527 A | 11/1992 | Nappholz et al. | |
| 5,163,428 A | 11/1992 | Pless | |
| 5,199,428 A | 4/1993 | Obel et al. | |
| 5,205,284 A | 4/1993 | Freeman | |
| 5,213,098 A | 5/1993 | Bennett et al. | |
| 5,231,381 A | 7/1993 | Duwaer | |
| 5,236,413 A | 8/1993 | Feiring | |
| 5,282,785 A | 2/1994 | Shapland et al. | |
| 5,284,491 A | 2/1994 | Sutton et al. | |
| 5,286,254 A | 2/1994 | Shapland et al. | |
| 5,305,745 A | 4/1994 | Zacouto | |
| 5,320,642 A | 6/1994 | Scheriag | |
| 5,320,643 A | 6/1994 | Roline et al. | |
| 5,327,887 A | 7/1994 | Nowakowski | |
| 5,346,506 A | 9/1994 | Mower et al. | |
| 5,353,800 A | 10/1994 | Pohndorf et al. | |
| 5,365,461 A | 11/1994 | Stein et al. | |
| 5,366,486 A | 11/1994 | Zipes et al. | |
| 5,368,040 A | 11/1994 | Carney | |
| 5,370,665 A | 12/1994 | Hudrlik | |
| 5,381,160 A | 1/1995 | Landmeier | |
| 5,386,837 A | 2/1995 | Sterzer | |
| 5,387,419 A | 2/1995 | Levy et al. | |
| 5,391,192 A | 2/1995 | Lu et al. | |
| 5,391,199 A | 2/1995 | Ben-Haim | |
| 5,398,683 A | 3/1995 | Edwards et al. | |
| 5,402,151 A | 3/1995 | Duwaer | |
| 5,411,531 A | 5/1995 | Hill et al. | |
| 5,415,629 A | 5/1995 | Henley | |
| 5,417,717 A | 5/1995 | Salo et al. | |
| 5,419,763 A | 5/1995 | Hildebrand | |
| 5,425,363 A | 6/1995 | Wang | |
| 5,443,485 A | 8/1995 | Housworth et al. | |
| 5,447,520 A | 9/1995 | Spano et al. | |
| 5,458,568 A | 10/1995 | Racchini et al. | |
| 5,464,020 A | 11/1995 | Lerner | |
| 5,468,254 A | 11/1995 | Hahn et al. | |
| 5,472,453 A | 12/1995 | Alt | |
| 5,476,484 A | 12/1995 | Hedberg | |
| 5,476,485 A | 12/1995 | Weinberg et al. | |
| 5,476,497 A | 12/1995 | Mower et al. | |
| 5,482,052 A | 1/1996 | Lerner | |
| 5,499,971 A | 3/1996 | Shapland et al. | |
| 5,501,662 A | 3/1996 | Hofmann | |
| 5,510,813 A | 4/1996 | Makinwa et al. | |
| 5,514,162 A | 5/1996 | Bornzin et al. | |
| 5,520,642 A | 5/1996 | Bigagli et al. | |
| 5,528,002 A | 6/1996 | Katabami | |
| 5,531,764 A | 7/1996 | Adams et al. | |
| 5,540,722 A | 7/1996 | Clare et al. | |
| 5,543,588 A | 8/1996 | Bisset et al. | |
| 5,543,589 A | 8/1996 | Buchana et al. | |
| 5,556,421 A | 9/1996 | Prutchi et al. | |
| 5,565,632 A | 10/1996 | Ogawa | |
| 5,568,809 A | 10/1996 | Ben-Haim | |
| 5,571,143 A | 11/1996 | Hoegnelid et al. | |
| 5,571,997 A | 11/1996 | Gray et al. | |
| 5,578,061 A | 11/1996 | Stroetmann et al. | |
| 5,584,804 A | 12/1996 | Klatz et al. | |
| 5,584,868 A | 12/1996 | Salo et al. | |
| 5,587,200 A | 12/1996 | Lorenz et al. | |
| 5,589,856 A | 12/1996 | Stein et al. | |
| 5,601,609 A | 2/1997 | Duncan | |
| 5,601,611 A | 2/1997 | Fayram et al. | |
| 5,622,687 A | 4/1997 | Krishnan et al. | |
| 5,626,622 A | 5/1997 | Cooper | |
| 5,634,899 A | 6/1997 | Shapland et al. | |
| 5,649,966 A | 7/1997 | Noren et al. | |
| 5,651,378 A | 7/1997 | Matheny et al. | |
| 5,670,755 A | 9/1997 | Kwon | |
| 5,674,251 A | 10/1997 | Combs et al. | |
| 5,674,259 A | 10/1997 | Gray | |
| 5,683,431 A | 11/1997 | Wang | |
| 5,687,734 A | 11/1997 | Dempsey et al. | |
| 5,713,935 A | 2/1998 | Prutchi et al. | |
| 5,720,768 A | 2/1998 | Verboven-Nelissen | |
| 5,735,876 A | 4/1998 | Kroll et al. | |
| 5,738,096 A | 4/1998 | Ben-Haim | |
| 5,738,105 A | 4/1998 | Kroll | |
| 5,755,740 A | 5/1998 | Nappholtz | |
| 5,777,607 A | 7/1998 | Koolen | |
| 5,782,876 A | 7/1998 | Flammang | |
| 5,782,881 A | 7/1998 | Lu et al. | |
| 5,790,106 A | 8/1998 | Hirano et al. | |
| 5,792,198 A | 8/1998 | Nappholz | |
| 5,792,208 A | 8/1998 | Gray | |
| 5,797,967 A | 8/1998 | Kenknight | |
| 5,807,234 A | 9/1998 | Bui et al. | |
| 5,807,306 A | 9/1998 | Shapland et al. | |
| 5,825,352 A * | 10/1998 | Bisset et al. | 345/173 |
| 5,841,078 A | 11/1998 | Miller et al. | |
| 5,844,506 A | 12/1998 | Binstead | |
| 5,854,881 A | 12/1998 | Yoshida et al. | |
| 5,861,583 A | 1/1999 | Schediwy et al. | |
| 5,865,787 A | 2/1999 | Shapland et al. | |
| 5,871,506 A | 2/1999 | Mower | |
| 5,906,607 A | 5/1999 | Taylor et al. | |
| 5,913,876 A | 6/1999 | Taylor et al. | |
| 5,927,284 A | 7/1999 | Borst et al. | |
| 5,956,020 A | 9/1999 | D'Amico et al. | |
| 6,006,134 A | 12/1999 | Hill et al. | |
| 6,032,074 A | 2/2000 | Collins | |
| 6,032,672 A | 3/2000 | Taylor | |
| 6,037,882 A | 3/2000 | Levy | |
| 6,041,252 A | 3/2000 | Walker et al. | |
| 6,061,177 A | 5/2000 | Fujimoto | |
| 6,067,470 A | 5/2000 | Mower | |
| 6,071,305 A | 6/2000 | Brown et al. | |
| 6,086,582 A | 7/2000 | Altman et al. | |
| 6,128,007 A | 10/2000 | Seybold et al. | |
| 6,133,906 A | 10/2000 | Geaghan | |
| 6,136,019 A | 10/2000 | Mower | |
| 6,141,586 A | 10/2000 | Mower | |
| 6,151,586 A | 11/2000 | Brown | |
| 6,178,351 B1 | 1/2001 | Mower | |

| | | | |
|---|---|---|---|
| 6,239,389 | B1 | 5/2001 | Allen et al. |
| 6,278,443 | B1 | 8/2001 | Amro et al. |
| 6,295,470 | B1 | 9/2001 | Mower |
| 6,297,811 | B1 * | 10/2001 | Kent et al. ............ 345/173 |
| 6,317,631 | B1 | 11/2001 | Ben-Haim et al. |
| 6,337,995 | B1 | 1/2002 | Mower |
| 6,341,235 | B1 | 1/2002 | Mower |
| 6,343,232 | B1 | 1/2002 | Mower |
| 6,392,636 | B1 | 5/2002 | Ferrari et al. |
| 6,411,847 | B1 | 6/2002 | Mower |
| 6,417,846 | B1 | 7/2002 | Lee |
| 6,433,069 | B1 | 8/2002 | Oeltjen et al. |
| 6,452,514 | B1 | 9/2002 | Philipp |
| 6,469,719 | B1 | 10/2002 | Kino et al. |
| 6,473,069 | B1 | 10/2002 | Gerpheide |
| 6,504,530 | B1 | 1/2003 | Wilson et al. |
| 6,505,745 | B1 | 1/2003 | Anderson |
| 6,507,093 | B2 | 1/2003 | Kaneda et al. |
| 6,555,235 | B1 | 4/2003 | Aufderheide et al. |
| RE38,119 | E | 5/2003 | Mower |
| 6,570,557 | B1 | 5/2003 | Westerman et al. |
| 6,583,676 | B2 | 6/2003 | Krah et al. |
| 6,587,093 | B1 | 7/2003 | Shaw et al. |
| 6,611,258 | B1 | 8/2003 | Tanaka et al. |
| 6,633,280 | B1 | 10/2003 | Matsumoto et al. |
| 6,667,740 | B2 | 12/2003 | Ely et al. |
| 6,690,156 | B1 | 2/2004 | Weiner et al. |
| 6,762,752 | B2 | 7/2004 | Perski et al. |
| 7,030,860 | B1 | 4/2006 | Hsu et al. |
| 7,372,455 | B2 * | 5/2008 | Perski et al. .......... 345/173 |
| 2002/0196066 | A1 | 12/2002 | Krah et al. |
| 2003/0098858 | A1 | 5/2003 | Perski et al. |
| 2003/0188899 | A1 | 10/2003 | Chao et al. |
| 2003/0234771 | A1 * | 12/2003 | Mulligan et al. ....... 345/174 |
| 2004/0105040 | A1 * | 6/2004 | Oh et al. ............... 349/12 |
| 2004/0155871 | A1 | 8/2004 | Perski et al. |
| 2004/0217945 | A1 * | 11/2004 | Miyamoto et al. ..... 345/173 |
| 2004/0233178 | A1 * | 11/2004 | Silk et al. .............. 345/179 |
| 2005/0052432 | A1 * | 3/2005 | Kraus et al. ............ 345/173 |
| 2005/0174259 | A1 * | 8/2005 | Ely ......................... 341/5 |
| 2006/0022959 | A1 * | 2/2006 | Geaghan ................. 345/173 |
| 2006/0097991 | A1 | 5/2006 | Hotelling et al. |
| 2007/0171211 | A1 | 7/2007 | Perski et al. |
| 2008/0048997 | A1 * | 2/2008 | Gillespie et al. ....... 345/174 |
| 2008/0218494 | A1 | 9/2008 | Perski et al. |
| 2008/0238879 | A1 * | 10/2008 | Jaeger et al. ........... 345/173 |

FOREIGN PATENT DOCUMENTS

| | | |
|---|---|---|
| EP | 0156593 | 10/1985 |
| EP | 0250931 | 1/1988 |
| EP | 0314078 | 5/1989 |
| EP | 0727241 | 8/1996 |
| JP | 04-038480 | 2/1992 |
| JP | 04117967 | 4/1992 |
| JP | 4365493 | 12/1992 |
| JP | 05-075828 | 10/1993 |
| JP | 7126600 | 5/1995 |
| JP | 8243176 | 9/1996 |
| JP | 2000-172447 | 6/2000 |
| JP | 2002-342033 | 11/2002 |
| WO | WO 91/19534 | 12/1991 |
| WO | WO 92/00716 | 1/1992 |
| WO | WO 95/08316 | 3/1995 |
| WO | WO 97/25101 | 7/1997 |
| WO | WO 98/10831 | 3/1998 |
| WO | WO 98/57701 | 12/1998 |
| WO | WO 99/03533 | 1/1999 |
| WO | WO 00/04947 | 2/2000 |
| WO | WO 02/10791 | 2/2002 |
| WO | WO 2004/070396 | 8/2004 |
| WO | WO 2005/114369 | 12/2005 |

OTHER PUBLICATIONS

Response Dated Jul. 12, 2010 to Notice of the Reason for Rejection of May 20, 2010 From the Korean Intellectual Property Office Re. Application No. 2005-7014719.

Response Dated Jun. 30, 2010 to Official Action Dated Apr. 1, 2010 From the US Patent and Trademark Office Re.: U.S. Appl. No. 11/727,301.

Response Dated Mar. 5, 2009 to Office Action Dated Jan. 16, 2009 From the State Intellectual Property Office of the People's Republic of China Re.: Application No. 200480009336.9 and Its Translation Into English.

Antman et al. "Treatment of 150 Cases of Life-Threatening Digitalis Intoxication With Digoxin-Specific Fab Antibody Fragments", Circulation, 81(6): 1744-1752, 1990.

Antoni et al. "Polarization Effects of Sinusoidal 50-Cycle Alternating Current on Membrane Potential of Mammalian Cardiac Fibres", Pflügers Archiv European Journal of Physiology, 314(4): 274-291, 1970. Abstract.

Bakker et al. "Beneficial Effects of Biventricular Pacing of Congestive Heart Failure", Pace, 17(Part II): 318, 1994.

Cazeau et al. "Multisite Pacing for End-Stage Heart Failure: Early Experience", Pacing and Clinical Electrophysiology, 19(11): 1748-1757, 1996, Abstract.

Cheng et al. "Calcium Sparks: Elementary Events Underlying Excitation-Contraction Coupling in Heart Muscle", Science, 262(5134): 740-744, 1993, Abstract.

Cooper "Postextrasystolic Potention. Do We Really Know What It Means and How to Use It?", Circulation, 88: 2962-2971, 1993.

Coulton et al. "Magnetic Fields and Intracellular Calcium; Effects on Lymphocytes Exposed to Conditions for 'Cyclotron Resonance'", Phys. Med. Biol., 38: 347-360, 1993, Abstract.

Dillion "Optial Recordings in the Rabbit Heart Show That Defibrillation Strength Shocks Prolong the Duration of Depolarization and the Refractory Period", Circulation Research, 69: 842-856, 1991.

Dillon "Synchronized Repolarization After Defibrillation Shocks. A Possible Component of the Defibrillation Process Demonstration by Optical Recordings in Rabbit Heart", Circulation, 85(5): 1865-1878, 1992.

Fain et al. "Improved Internal Defibrillation Efficacy With a Biphasic Waveform", American Heart Journal, 117(2): 358-364, 1989, Abstract.

Fleg et al. "Impact of Age on the Cardiovasvular Response to Dynamic Upright Exercise in Healthy Men and Women", Journal of Applied Physiologyl, 78: 890-900, 1995, Abstract.

Fleischhauer et al. "Electrical Resistances of Interstitial and Microvascular Space as Determinants of the Extracellular Electrical Field and Velocity of Propagation in Ventricular Myocardium", Circulation, 92: 587-594, 1995.

Foster et al. "Acute Hemodynamic Effects of Atrio—Biventricular Padng in Humans", The Society of Thoracic Surgeons, 59: 294-300, 1995, Abstract.

Franz "Bridging the Gap Between Basic Clinical Electrophysiology: What Can Be Learned From Monophasic Action Potential Recordings?", Journal Cardiovasc Electrophysiology, 5(8): 699-710, 1994, Abstract.

Franz "Method and Theory of Monophasic Action Potential Recording", Prog. Cardiovasc Dis, 33(6): 347-368, 1991.

Langberg et al. "Identification of Ventricular Tachycardia with Use of the Morphology of the Endocardial Electrogram", Circulation, 77(6): 1363-1369, 1988.

Lindstrom et al. "Intracellular Calcium Oscillations in a T-Cell Line After Exposure to Extremely-Low-Frequency Magnetic Fields with Variable Frequencies and Flux Densities", Bioelectromagnetics, 16(1): 41-47, 1995, Abstract.

Pumir et al. "Control of Rotating Waves in Cardiac Muscle: Analysis of the Effect of Electric Fields", Proceedings: Biological Sciences, 257(1349): 129-134, 1994, Abstract.

Ranjan et al. "Electrical Stimulation of Cardiac Myocytes", Annals of Biomedical Engineering, 23(6): 812-821, 1995, Abstract.

Saksena et al. "Prevention of Recurrent Atrial Fibrillation With Chronic Dual-Site Right Atrial Pacing", Journal of the American College of Cardiology, 28(3): 687-694, 1996, Abstract.

Talit et al. "The Effect of External Cardiac Pacing on Stroke Volume", pace, 13(5): 598-602, 1990, Abstract.

Taniguchi et al. "Inhomogeneity of Cellular Activation Time and Vmax in Normal Myocardial Tissue Under Electrical Field Stimulation", Am. J. Physiol., 267: H694-H705, 1994, Abstract.

Thakor et al. "Effect of Varying Pacing Waveform Shapes on Propagation and Hemodynamics in the Rabbit Heart", The Americal Journal of Cardiology, 79(6A): 36-43, 1997, Abstract.
Tsong "Electroporation of Cell Membranes", Biophysical Journal, 60: 297-306, 1991.
Verrier et al. "Electrophysiologic Basis for T Wave Alternans as an Index of Vulnerability to Ventricular Fibrillation", Journal of Cardiovascular Electrophysiology, 5(5): 445-461, 1994. Abstract.
Webster Design of Cardiac Pacemakers, IEEE Press, p. xi-xiii, 1995.
Wessale et al. "Stroke Volume and the Three Phase Cardiac Output Rate Relationship With Ventricular Pacing", PACE, 13: 673-680, 1990.
Windle et al. "Subthreshold Conditioning Stimuli Prolong Human Ventricular Refractoriness", Am. J. Cardiol., 57(6): 381-386, 1986, Abstract.
Wirtzfeld et al. "Physiological Pacing: Present Status and Future Developments", Pace, 10(Part I): 41-57, 1987. Abstract.
Xue et al. "Neural-Network-Based Adaptive Matched Filtering for QRS Detection", IEEE Transactions on Biomedical Engineering, 39(4): 317-329, 1992, Abstract.
Bargheer et al. "Prolongation of Monophasic Action Potential Duration and the Refractory Period in the Human Heart by Tedisamil, A New Potassium-Blocking Agent", Journal European Heart, 15(10): 1409-1414, 1994, Abstract.
Bers "Excitation Contraction Coupling and Cardiac Contractile Force", Internal Medicine, 237(2): 17, 1991, Abstract.
Borst et al. "Coronary Artery Bypass Grating Without Cardiopulomonary Bypass and Without Interuption of Native Coronary Flow Using a Novel Anastomosis Site Restraining Device (Octupus)", Journal of the American College of Cardiology, 27(6): 1356-1364, 1996.
Cano et al. "Dose-Dependent Reversal of Dixogin-Inhibited Activity of an In-Vitro Na+K+ATPase Model by Digoxin-Specific Antibody", Toxicology Letters, 85(2): 107-1011, 1996.
Fromer et al. "Ultrarapid Subthreshold Stimulation for Termination of Atriventricular Node Reentrant Tachycardia", Journal of the American College Cardiology, 20: 879-883, 1992.
Fu et al. "System Identification of Electrically Coupled Smooth Music Cells: The Passive Electrically Coupled Smooth Muscle Cells: The Passive Electrical Properties", IEEE Transactions on Biomedical Engineering, 38(11): 1130-1140, 1991.
Gill et al. "Refractory Period Extension During Ventricular Pacing at Fibrillatory Pacing Rates", Pacing and Clinical Elctrophysiology, 20(3): 647-653, 1997, Abstract.
Ham et al. "Classification of Cardiac Arrhythmias Using Fuzzy Artmap", IEEE Transactions on Biomedical Engineering, 43(4): 425-429, 1996, Abstract.
Hoffman et al. "Effects of Postextrasystolic Potentiation on Normal and Failing Hearts", Bulletin of the New York Academy of Medicine, 41(5): 498-534, 1965.
Josephson "Clinical Cardiac Electrophysiology: Techniques and Interpertations", Lea & Feb iger, 2nd Ed., 2 P., 1991.
King et al. "The Inotropic Action of Paired Pulse Stimulation in the Normal and Failing Heart: An Experimental Study", Cardiovascular Research, 2: 122-129, 1968.
Knisley et al. "Prolgongation and Shortening of Action Potentials by Electrical Shocks in Frog Ventricular Muscle", American Journal of Physiology, 266(6): H2348-H2358, 1994, Abstract.
Koller et al. "Relation Between Repolarization and Refractoriness During Programmed Electrical Stimulation in the Human Right Ventricle", Circulation, 91(9): 2378-2384, 1995, Abstract.
Matheny et al. "Vagus Nerve Stimulation as a Method to Temporarily Slow or Arrest the Heart", Annals of Thoracic Surgery, 63(6): S28-29, 1997, Abstract.
McVeigh et al. "Noninvasive Measurement of Transmural Gradients in Myocardial Strain With MR Imaging", Radiology, 180(3): 677, 679-684, 1991.
Mercando et al. "Automated Detection of Tachycardias by Antitachycardia Devices", Cardiac Electrophysiology: From Cell to Bedside, Chap.100: 943-948, 2004.
Moran et al. "Digoxin-Specific Fab Fragments Impair Renal Function in the Rat", Journal of Pharmacy and Pharmacology, 46(10): 854-856, 1994, Abstract.
Morse et al. "A Guide to Cardiac Pacemakers, Defibrillators and Related Products".
Nannini et al. "Muscle Recruitment With Intrafascicular Electrodes", IEEE Transactions on Biomedical Engineering, 38: 769-776, 1991, Abstract.
Paul et al. "Automatic Recognition of Ventricular Arrhythmias Using Temporal Electrogram Analysis", PACE, 14: 1265-1273, 1991.

Schwartz et al. "Exposure of Frog Hearts to CW or Amplitude-Modified VHF Fields: Selective Efflux of Calcium Ions at 16 Hz", Bioelectromagnetics, 11(4): 349-358, 1990, Abstract.
Shumaik et al. "Oleander Poisoning: Treatment With Digoxin-Specific Fab Antibody Fragments", Annals of Emergency Medicine, 17(7): 732-735, 1988.
Skale et al. "Inhibition of Premature Ventricular Extrastimuli by Subthreshold Conditioning Stimuli", J. Am. Coll. Cardiol., 6: 133-140, 1985, Abstract.
Sweeny et al. "Countershock Strength-Duration Relationship for Myocardial Refractory Period Extension", Academic Emergency Medicine, 2(1): 57-62, 1995, Abstract.
Sweeny et al. "Refractory Interval After Transcardiac Shocks During Ventricular Fibrillation", Circulation, 94(11): 2947-2952, 1996.
Sweeny et al. "Ventricular Refractory Period Extension Caused by Defibrillation Shocks", Circulation, 82(3): 965-972, 1990.
Zipes et al. "Cardiac Electrophysiology—From Cell to Bedside", Saunders Co., 4th Ed., 1990.
Translation of Office Action Dated Sep. 6, 2010 From the State Intellectual Property Office of the People's Republic of China Re.: Application No. 200810081184.3.
Notice of Allowance Dated Sep. 7, 2010 From the US Patent and Trademark Office Re. U.S. Appl. No. 11/727,301.
Response Dated Jul. 13, 2010 to Notice of the Reason for Rejection of May 20, 2010 From the Korean Intellectual Property Office Re. Application No. 2005-7014719.
Office Action Dated Jan. 16, 2009 From the State Intellectual Property Office of the People's Republic of China Re.: Application No. 200480009336.9 and Its Translation Into English.
Communication Pursuant to Article 94(3) EPC Dated Mar. 4, 2009 From the European Patent Office Re.: Application No. 04702401.3.
Communication Pursuant to Article 94(3) EPC Dated Feb. 12, 2010 From the European Patent Office Re.: Application No. 09163720.7.
International Preliminary Report on Patentability Dated Aug. 25, 2005 From the International Bureau of WIPO Re.: Application No. PCT/IL2004/000045.
International Search Report Dated Feb. 28, 2005 From the International Searching Authority Re.: Application No. PCT/IL04/00045.
Office Action Dated Nov. 2, 2007 From the Patent Office of the People's Republic of China Re.: Application No. 2004800009336.9.
Official Action Dated Apr. 1, 2010 From the US Patent and Trademark Office Re.: U.S. Appl. No. 11/727,301.
Response Dated Jun. 9, 2010 to Communication Pursuant to Article 94(3) EPC of Feb. 12, 2010 From the European Patent Office Re.: Application No. 09163720.7.
Response Dated Jan. 18, 2010 to Office Action and Proposed Amendments to Claims of Oct. 30, 2009 From the State Intellectual Property Office of the People's Republic of China Re.: Application No. 200810081184.3.
Supplementary European Search Report Dated Dec. 3, 2008 From the European Patent Office Re.: Application No. 04702401.3.
Translation of Notice of the Reason for Rejection Dated May 20, 2010 From the Korean Intellectual Property Office Re. Application No. 2005-7014719.
Translation of Notification of Reasons of Rejection Dated Dec. 26, 2008 From the Japanese Patent Office Re.: Application No. 2006-502619.
Translation of Office Action and Proposed Amendments to Claims Dated Oct. 30, 2009 From the State Intellectual Property Office of the People's Republic of China Re.: Application No. 200810081184.3.
Translation of the Examination Report Dated Apr. 3, 2008 From the Government of India, Patent Office Re.: Application No. 1821/CHENP/2005.
Written Opinion Dated Feb. 28, 2005 From the International Searching Authority Re.: Application No. PCT/IL04/00045.
Response Dated Mar. 12, 2009 to Japanese Office Action of Dec. 26, 2008 From the Japanese Patent Office, Re. Application No. 2006-502619.
Response Dated Feb. 12, 2008 to Office Action of Nov. 2, 2007 From the Patent Office of the People's Republic of China Re.: Application No. 2004800009336.9.
Translation of Office Action Dated Oct. 19, 2011 From the State Intellectual Property Office of the People's Republic of China Re. Application No. 201110031381.6.
Rekimoto "SmartSkin: An Infrastructure for Freehand Manipulation on Interactive Surfaces," CHI2002 vol. 4, Issue 1: 113-120, 2002.

* cited by examiner

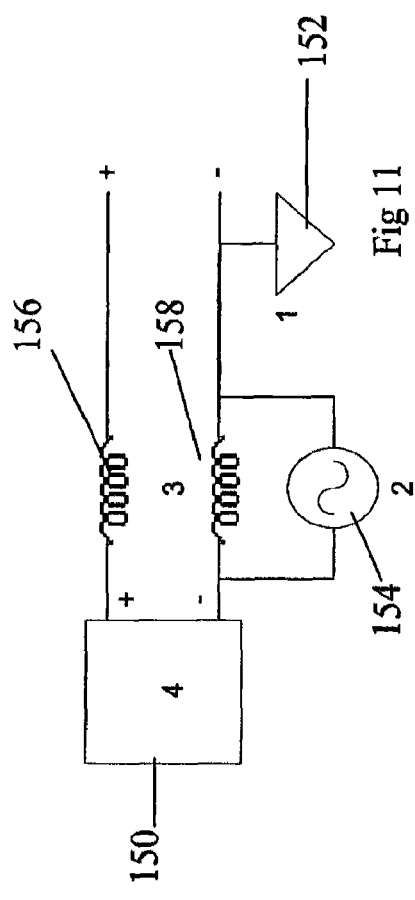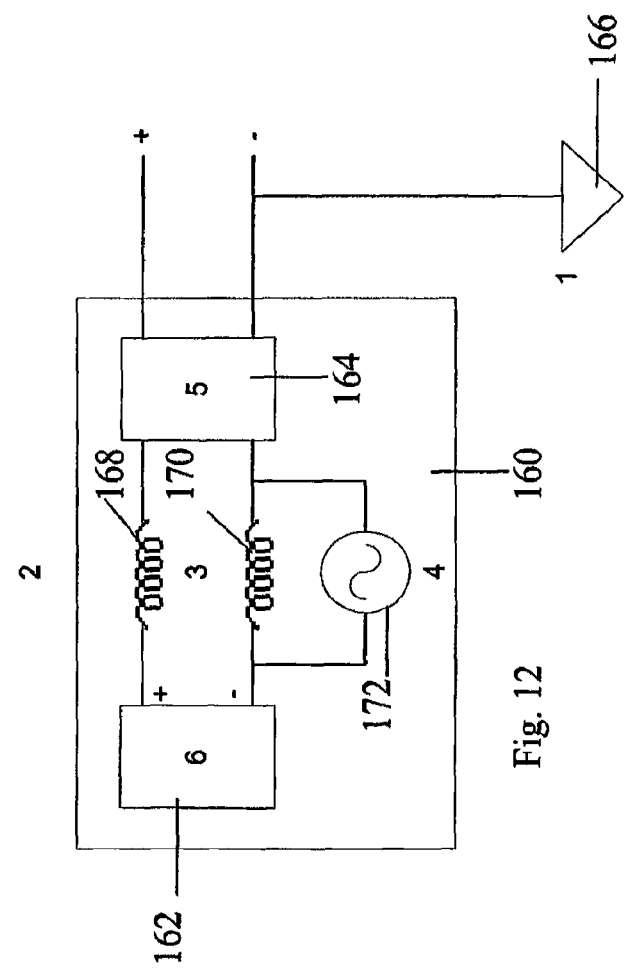

TOUCH DETECTION FOR A DIGITIZER

RELATED APPLICATIONS

This application is a Continuation of U.S. patent application Ser. No. 11/727,301 filed on Mar. 26, 2007 now U.S. Pat. No. 7,843,439 which is a Divisional of U.S. patent application Ser. No. 10/757,489 filed on Jan. 15, 2004, now U.S. Pat. No. 7,372,455, issued on May 13, 2008, which claims the benefit of U.S. Provisional Patent Application No. 60/446,808 filed on Feb. 10, 2003, and U.S. Provisional Patent Application No. 60/501,484 filed on Sep. 5, 2003, the contents of which are hereby incorporated by reference.

FIELD AND BACKGROUND OF THE INVENTION

The present invention relates to a combined touch and stylus digitizer and, more particularly, but not exclusively to adaptations for the detection of finger touch.

The popularity of computers has given rise to extensive research and development in the field of digitizers and touch screens. There are many inventions describing touch panels but very few describe a digitizer capable of detecting both an EM stylus and finger touch using the same sensing device. U.S. patent application Ser. No. 09/629,334 "Physical Object Location Apparatus and Method and a Platform using the same" filed Jul. 7, 2000 assigned to N-trig Ltd and U.S. patent application Ser. No. 09/628,334 "Transparent Digitizer" filed Aug. 28, 2003 also assigned to N-trig Ltd describe positioning devices capable of detecting multiple physical objects, preferably styluses, located on a flat screen display.

U.S. patent application Ser. No. 10/270,373 "Dual Function Input Device And Method" filed Oct. 15, 2002 and assigned to N-trig Ltd, describes a system capable of detecting electro magnetic objects and finger touch using the same transparent sensor. In the disclosure, the finger touch detection is implemented by a matrix of resistive stripes that are merged into the EM detection pattern. A special separation layer is placed between the conductor layers so as simultaneously to enable touch stripe contact and prevent contact between the EM lines. Additional electronics are required to drive and read the touch signals from the sensor. The major disadvantage of this method is the additional complexity to both sensor and electronics.

U.S. Pat. No. 3,944,740 employs an input pad mounted over the top of a plasma panel display. The input pad is a matrix of conductive rows and columns that are arranged so that a stylus having a conductive tip can short circuit a row electrode and a column electrode at its point of contact, with current conducted through the row and column electrodes representing the stylus location. U.S. Pat. No. 4,639,720 employs a similar idea using conductive pixels rather then a matrix of rows and columns.

Two major disadvantages of the above patents are low resolution of the stylus detection and inability to specifically detect an electromagnetic type stylus. Since the stylus is detected only when it shortcuts two adjutant lines\pixels it is impossible to track it when it is located between the lines\pixels. Therefore the resolution of the stylus detection is limited to the proximity of the lines\pixels. The stylus detection, as disclosed in these patents, is inherently different from the one described in the presently preferred embodiments.

U.S. Pat. No. 6,239,389 describes a method of finger detection by measuring a first set of voltage values from each conductive line, and calculating a weighted average of these samples with respect to samples made without the presence of a finger. The sensor is constructed from a series of plates arranged in rows and columns and connected by a conductive line. The main disadvantages of this method are that it requires an arithmetic unit for calculating the weighted average of the sampled values, it does not allow the detection of an EM stylus and the sensor is not transparent.

U.S. Pat. No. 4,550,221 describes a sensor array comprising of series of conductive plates/pixels connected by a conductive wire. A finger touch changes the pixel's capacitance with respect to ambient ground. The change is detected and translated to indicate a finger's position. The disclosure does not allow the detection of an EM stylus together with finger detection. The sensor's plate\pixels are not transparent and therefore cannot be mounted on a display screen.

U.S. Pat. No. 4,293,734 employs two current sources driving predetermined currents through each end of the antenna. The finger's position is calculated using Kirchoff's laws for current leakage through the finger to the ground. Disadvantages of the detection system disclosed therein are that it does not allow the detection of an EM stylus. Rather it requires current flows from both ends of the conductive surface which is in evidently power consuming. Furthermore, the detection is analog and involves relatively complicated circuitry.

U.S. Pat. No. 6,452,514 employs two or more electrodes arranged to create an electric field transmitted through an adjacent dielectric, which can be disturbed by the proximity of a conductive object. A charge transfer measurement circuit is connected to one of the electrodes to determine the existence of the object. The disclosure teaches connecting each electrode to an individual charge transfer measurement unit. Disadvantages of the above invention are the inability to detect an EM stylus, low update rate and limited resolution.

U.S. Pat. No. 6,583,676 describes a method of detecting a finger's added capacitance upon application of a frequency change. A calibration circuit and method for a proximity/touch detector allow automatic calibration to the proximity/touch detector components, chassis affects, and ambient conditions such that initial factory calibration and periodic manual calibration are not needed. The calibration circuit switches a capacitance into the input capacitance of a Schmitt trigger free running oscillator to change the output frequency of the oscillator. A capacitive sensor forms part of the input capacitance. The change in frequency simulates the frequency shift associated with the difference in input capacitance generated when an object, such as a finger, is touching the capacitive sensor and when the capacitive sensor is free from contact with the object. The most evident disadvantages of this invention is the need for additional hardware and the inability to detect an EM stylus.

Other methods of finger detection can be founds in U.S. Pat. Nos. 6,587,093, 6,633,280, 6,473,069, and 6,278,443. The above describe methods of finger detection all inherently different from the methods described hereinbelow, and none combine the ability to sense both an EM stylus and a finger touch.

There is thus a widely recognized need for, and it would be highly advantageous to have, a digitizer system devoid of the above limitations.

SUMMARY OF THE INVENTION

According to one aspect of the present invention there is provided a detector for providing position detection of a first kind together with position detection of a second kind, the detector comprising:

a sensor, a patterned arrangement of sensing conductors extending within the sensor, and detection circuitry associated with the arrangement for detecting signals at same sensing conductors arising from the position detection of a first kind and signals arising from the position detection of a second kind, therefrom to detect positions at the sensor.

Preferably, the position detection of a first kind comprises resonance-based object detection of an object able to produce an electromagnetic resonant field.

Preferably, the position detection of a first kind comprises capacitive-based touch detection.

Preferably, the position detection of a first kind comprises resonance-based object detection of an object able to produce an electromagnetic resonant field and the position detection of a second kind comprises capacitive-based touch detection.

Preferably, the detection circuitry is capable of detecting interactions of the first kind and the interactions of the second kind simultaneously.

Preferably, the detection circuitry is capable of detecting interactions of the first kind and the interactions of the second kind independently.

Preferably, the sensor is located over a detection region, and comprises an oscillator for providing an oscillating signal, excitation circuitry for providing an excitation signal capable of exciting a resonant circuit of an electromagnetic stylus-type object, wherein the patterned arrangement comprises conductive elements extending over the detection region, and wherein the detection circuitry is adapted for detecting the capacitive effect of a conductive object, such as finger touch, and resonance from the electromagnetic stylus-type object at the at least one conductive element.

Preferably, the oscillator is connected to provide the oscillating signal to the excitation circuitry and also to provide an excitation signal for the capacitive based touch detection.

Preferably, the sensor is substantially transparent and suitable for location over a display screen.

Preferably, the detection region is the surface of a display screen and wherein the sensor including the at least one conductive element is substantially transparent.

The detector may comprise a plurality of conductive elements and the detection circuitry may comprise a differential detector arrangement associated with the sensing conductors for detecting differences between outputs of the conductors.

Preferably, the sensing circuitry is configured for sensing a signal at the at least one sensing conductive element induced by a touch of a conductive object subjected to a transmission of the oscillated signal.

Preferably, there is provided at least a second conductive element located within the sensor and having a junction with the one conductive element, wherein the oscillator is applied to one of the conductive element and the junction is configured such that a touch by a capacitive body part causes an a.c short at the junction, the detector being configured to detect a resulting oscillating signal at the second conductive element and therefrom to infer the touch.

Preferably, the detection circuitry is adapted to detect a signal at the at least second conductive element for interpretation as a number of touching objects.

Preferably, multiple resonance-based objects can be detected based on the interpretation of properties of the detected signal.

Preferably, multiple conductive objects can be detected based on the interpretation of properties of the detected signal.

Preferably, the oscillator is connected to oscillate at least one of the detector, part of the detector and the at least one conductive element with respect to a reference voltage level, thereby to permit a capacitive current flow between a conductive touching object and the at least one conductor.

Preferably, the sensor is configured with a transparent medium between itself and an underlying display screen.

Preferably, the transparent medium comprises an air gap.

According to a second aspect of the present invention there is provided a detector for detecting touches by conductive objects making capacitive contact with a transparent sensor located over a display screen, the detector comprising:

a patterned arrangement of sensing conductors extending into the sensor, a source of oscillating electrical energy at a predetermined frequency, and detection circuitry for detecting a capacitive influence on the at least one sensing conductor when the oscillating electrical energy is applied.

Preferably, the detection circuitry comprises a differential detector arrangement associated with the sensing conductors for detecting differences between outputs of the conductors.

Preferably, the source of oscillating electrical energy is configured to transmit the energy into the conductive object, and the sensing circuitry is configured for sensing a signal at the at least one sensing conductive element induced by a touch of a conductive object subjected to the transmitted oscillated signal.

The detector is preferably configured to interpret a property of a signal detected at the at least one conductor in terms of a number of touching conductive objects.

Preferably, there is provided at least a second conductor located within the sensor and having a junction with the at least one conductor, wherein the source of oscillating electrical energy is applied to one of the conductors and the junction is configured such that a touch by a conductive object causes an a.c short at the junction the detector being configured to detect the oscillating signal at the second conductor as the capacitive effect and to infer the touch.

Preferably, the detection circuitry is configured to interpret a property of a detected signal as a number of touches of a corresponding conductor.

The detector may comprise a matrix of first sensors aligned in a first direction and second sensors aligned in a second direction with a plurality of junctions in between. There may additionally be provided a tabulation of leakage capacitance values for each junction, the detector being configured to use the leakage capacitance values to correct readings at each conductor.

Preferably, the source of oscillating electrical energy is connected to oscillate at least one of the detector, part of the detector and the at least one conductor with respect to a reference voltage level, thereby to permit a capacitive current flow between the conductive object and the at least one conductor.

Preferably, the source of oscillating energy is connected to oscillate a first part of the detector, and wherein the first part is connected to a second part not subject to oscillations via a communication connection unaffected by the potential difference between the first and the second parts of the detector.

Preferably, the communication connection comprises at least one differential amplifier.

Preferably, the sensor is configured with a transparent medium between itself and the display screen.

Preferably, the transparent medium comprises an air gap.

Preferably, the sensor comprises a grid of conductors arranged within a layer thereof.

Preferably, the conductors are connected pairwise to amplifiers.

Preferably, the amplifiers are differential amplifiers each having a positive input and a negative input and wherein one conductor of the pair is connected to the positive input and a second conductor of the pair is connected to the negative input.

The detector may comprise a compensation table for providing a compensation value at each conductor to compensate for static noise.

The detector may be configured to update the compensation table upon system startup.

The detector may be configured to use an ambiguous object detection as a trigger to refresh the compensation table.

Preferably, any combination of number, phase and position data from detected signals are used to define ambiguity in object detection.

According to a third aspect of the present invention there is provided a method of touch sensing at a matrix of sensing conductors located in a transparent sensor over an electronic display screen, comprising:

providing an oscillating signal at a predetermined frequency, and measuring the conductors for capacitive effects on the conductors due to touch thereon.

The method may comprise providing the oscillating signal to an external transmitter to energize a touching body part.

Preferably, the matrix comprises first conductors aligned in a first direction and second conductors aligned in a second direction, the method comprising providing the oscillating signal to the first conductors and sensing the oscillating signal at any of the second conductors to which the signal has been passed by a capacitive link caused by a touching conductive object.

The method may comprise providing the oscillating signal to at least the conductors such that a conductive touching body drains current from a respective conductor.

The method may comprise using the oscillating signal to oscillate a detection mechanism comprising the conductors wherein the oscillated detection mechanism is simultaneously isolated from common ground.

The method may comprise using the oscillating signal to oscillate a first part of a detection mechanism, the first part comprising the conductors, isolating the first part from a second part, and using the isolated second part to communicate touch detection outputs to external devices.

According to a fourth aspect of the present invention there is provided a method of manufacture of a touch detector for an electronic display screen, comprising:

providing an oscillation signal source, embedding a grid of transparent conductors within at least one transparent foil, placing the transparent foil over the electronic display screen, and providing detection circuitry for detecting capacitive effects on the conductors.

The method may comprise applying an excitation unit about the electronic screen for exciting an electromagnetic stylus, so that location of the stylus is detectable at the grid of transparent conductors.

According to a fifth aspect of the present invention there is provided a Touch detection apparatus comprising:

a sensor comprising at least one sensing conductive element, an oscillator for providing an oscillation signal, a transmitter, associated with the oscillator, for transmitting the oscillation signal in the vicinity of the sensor, sensing circuitry for sensing a signal at the at least one sensing conductive element induced by a touch of a conductive object subjected to the transmitted oscillated signal.

According to a sixth aspect of the present invention there is provided a touch detection apparatus comprising:

a sensor comprising a grid array of conductors in a first sense and conductors in a second sense and having junctions therebetween, an oscillator for providing an oscillation signal to conductors in the first sense, detection circuitry for detecting the oscillation signal when transferred via the junctions to conductors in the second sense, the transference being indicative of capacitive coupling induced by a touch of a conductive object touching the sensor at a respective junction.

According to a seventh aspect of the present invention there is provided touch detection apparatus comprising:

a sensor comprising at least one sensing conductive element, an oscillator for providing an oscillation signal, the oscillation signal being applied to at least part of the apparatus including the at least one sensing conductive element, and detection circuitry for detecting a.c. grounding of the at least one sensing conductive element due to a capacitive connection to a conductive object touching the sensor.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 11 is a block diagram illustrating coil-based isolation of the detector according to an embodiment of the present invention;

FIG. 12 is a block diagram illustrating a variation of the embodiment of FIG. 11 in which the coil based isolation is used for a part of the detector;

DESCRIPTION OF THE PREFERRED EMBODIMENTS

Figure 1A:
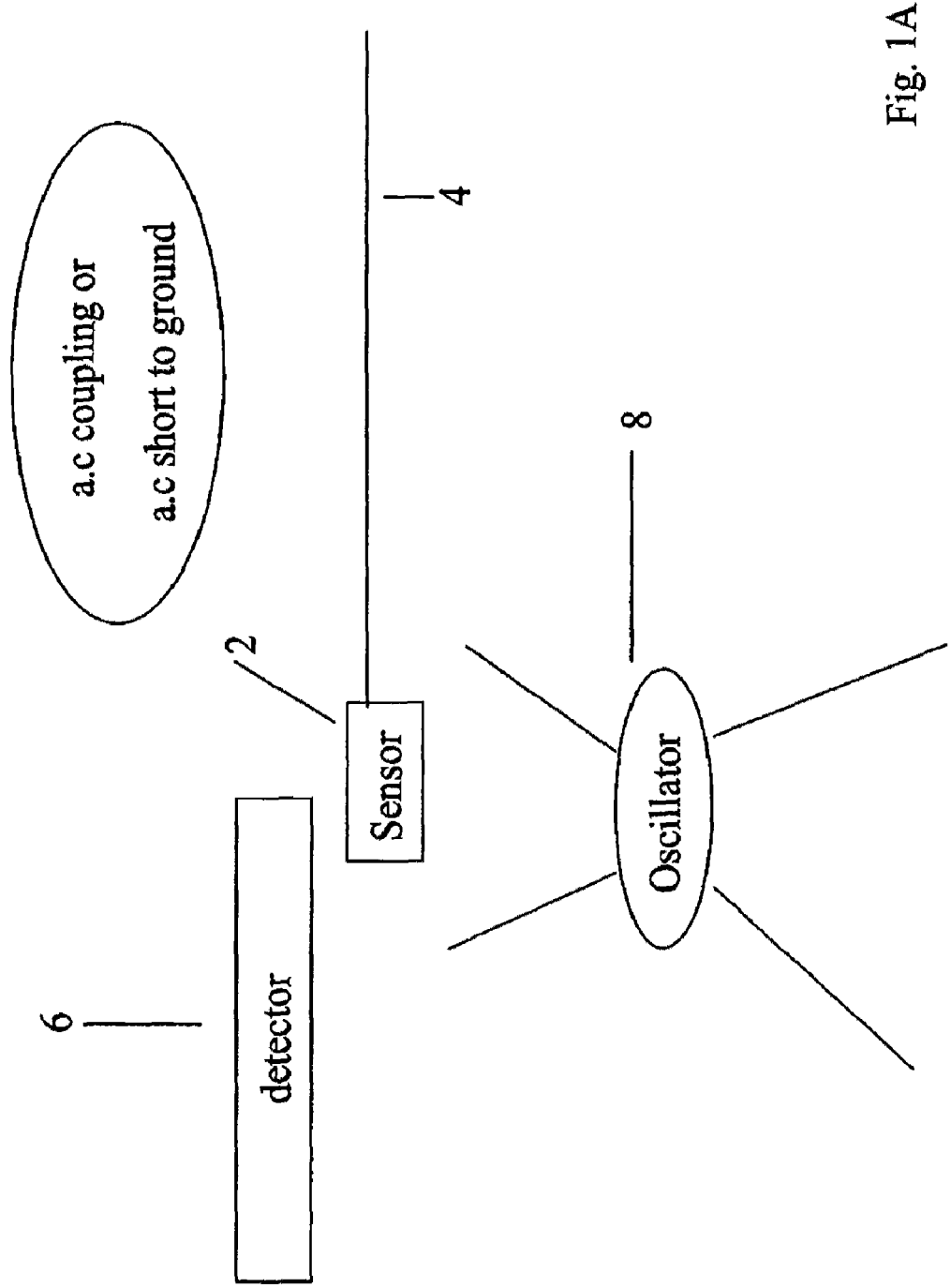
FIG. 1A is a simplified block diagram showing a generalized embodiment of the present invention.

The present embodiments comprise a digitizer that allows finger clicks and movement detection on flat panel displays, in such a way that the same sensing infrastructure can be used for electromagnetic (EM) stylus detection. The digitizer is designed to work in conjunction with a patterned transparent conductive foil system, which allows for detecting the location of an electro magnetic stylus on top of an electronic display surface. Some of the presently preferred embodiments use finger induced capacitance connecting the sensor lines as a method of finger detection. The present embodiments include inter alia a method of identifying the presence and location of the finger by measuring the differential signal between two different sensor antennas. In the preferred embodiments the currents are driven from one end of the antenna, and the information is then sensed and digitized using the detector as will be described in greater detail hereinbelow.

Whilst the prior art teaches connection of a separate charge sensor or the like to each electrode, the present embodiments are able to utilize the differential signal generated between two electrodes.

One of the methods disclosed hereinbelow involves measuring voltage differences due to the finger's adding a capacitive short circuit to the ground.

The primary use of the preferred embodiments is to allow a natural and intuitive operation of an "on-screen-keyboard", in devices such as the tablet PC, separately, in addition and in parallel to the operation of an accurate electro magnetic stylus.

In the following description there are presented three methods of implementing touch sensors using the same detector unit and sensor grid used for the detection of an EM stylus. The sensing methods disclosed may require adjustments for given circumstances and devices, as will be apparent to the person skilled in the art. However, all methods are designed to enable the simultaneous and independent detection of an EM stylus in a manner similar to that disclosed in U.S. patent application Ser. No. 10/649,708 to the present assignee, filed 28 Aug. 2003, and claiming priority from U.S. Provisional Patent Application No. 60/406,662. Detection of finger touch and EM stylus is independent and can be performed simultaneously or at different times. It is left to the discretion of the user whether to use the presently disclosed embodiments in order to implement a detector for one kind of interaction alone (i.e. finger touch or EM stylus) or to allow the detection of both kinds of interactions.

In the preferred embodiments of the present invention, the same detector can detect and process signals from an Electro Magnetic Stylus whether it is placed in contact with, or at a short distance from, the surface of a flat panel display. For example detection may be carried out in the manner described in U.S. patent application Ser. No. 09/628,334 "Physical Object Location Apparatus and Method and a Platform using the same" assigned to N-trig Ltd, and U.S. patent application Ser. No. 09/628,334 "Transparent Digitizer" again assigned to N-trig Ltd). At the same time the detector can be used to detect a user's finger placed on the same display, as will be described hereinbelow. In other embodiments of the present invention the finger detection may function solely, or in combination with any other input device.

The principles and operation of a digitizer according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1A, which is a schematic diagram illustrating a generalized embodiment of the present invention. In FIG. 1A a sensor 2 comprises at least one electrical conductor 4. In the typical case there is more than one conductor, and the conductors are set in an arrangement or pattern over the sensor, most often as a grid which extends over a surface such as an electronic screen for which touch sensing is required. A detector 6 picks up the output from the conductors. An oscillator 8 provides oscillations or a.c. energy to the system comprising the sensor and detector. In one embodiment, the system is not initially a.c. coupled. However a conductive object, including body parts such as fingers are capacitive and therefore touch by a finger or the like completes the a.c. coupling within the system and allows the touch to be sensed. Alternatively a touch by the finger may provide an a.c. short circuit to ground for a given conductor, again allowing the touch to be sensed.

A preferred embodiment detects touch as described above and additionally allows the location and identification of physical objects, such as styluses. The location of the physical objects is sensed by an electro magnetic transparent digitizer, preferably constructed on top of a display, and it is a feature of some of the preferred embodiments that the electromagnetic transparent digitizer makes use of the same components as the touch digitizer described herein, so that the two types of detection can be incorporated into a single digitizer, as will be explained hereinbelow. The construction of a suitable electromagnetic transparent digitizer is described in U.S. patent application Ser. No. 09/628,334. This application describes a sensing device that is capable of detecting multiple physical objects located on top of a flat screen display.

The various components and functionality manner of the transparent digitizer are as follows.

1.

a. Sensor

As described in the above referred to applications and used in the presently preferred embodiments, the sensor comprises two transparent foils, one containing a set of vertical conductors and the other a set of horizontal conductors. The grid of conductive lines is made of conductive materials patterned on the transparent foils, which may for example be PET foils.

Further information regarding the construction of the sensor is available from U.S. provisional patent application 60/406,662 (sub-chapter 4.2 entitled: "Sensor") and corresponding U.S. patent application Ser. No. 10/649,708 filed Aug. 28, 2003, both assigned to N-Trig. Ltd. the contents of both of which are hereby incorporated by reference.

b. Front End Unit

As described in the above referred to applications and used in the presently preferred embodiments, the detectors include front end units, which are the first stage where sensor signals are processed.

Front end units function as follows:

Differential amplifiers amplify the signals and forward the result to a switch. The switch selects the forwarded inputs that appear to need further processing. In other words the switch filters out those inputs where no activity appears to be occurring. The selected signals are amplified and filtered by a Filter & Amplifier arrangement prior to sampling. The output of the filter and amplifier arrangement is then sampled by an A to D converter and sent to a digital unit via a serial buffer.

For further information see U.S. provisional patent application 60/406,662 (sub-chapter 4.3 entitled: "Front end") and corresponding U.S. patent application Ser. No. 10/649,708 filed Aug. 28, 2003, both assigned to N-Trig. Ltd. the contents of both of which are hereby incorporated by reference.

c. Digital Unit

As described in the above referred to applications and used in the presently preferred embodiments, there is provided a digital unit or microprocessor, which functions as follows:

A front-end interface receives serial inputs of sampled signals from the various front-end units and packs them into parallel representation.

A digital signal processor (DSP) core, which performs the digital unit processing, reads the sampled data, processes it and determines the position of the physical objects, such as stylus or finger.

A calculated position is sent to the host computer via link.

For further information see U.S. provisional patent application 60/406,662 (sub-chapter 4.4 entitled: "Digital unit") and corresponding U.S. patent application Ser. No. 10/649,708 filed Aug. 28, 2003, both assigned to N-Trig. Ltd. the contents of both of which are hereby incorporated by reference. The above-mentioned applications discuss signal processing and position determination for signals emanating from an electromagnetic EM stylus, but do not provide any disclosure regarding finger detection. As will be explained below, in the present embodiments, finger touch may be detected using compatible signals on the same detection conductors which are processed in substantially the same way. It makes no substantial difference to the DSP core or to the intervening electronics whether the signals originate from a finger or from a stylus.

d. Detector

A detector consists of the digital unit and the Front end units, as described above.

2. Stylus Detection

As described in the above referred to applications and used in the presently preferred embodiments, simultaneous and separate inputs, either from a stylus or from a finger, can be detected.

The preferred embodiment of the present invention utilizes a passive EM stylus that includes a resonance circuit. An external excitation coil that surrounds the sensor excites the resonance circuit within the stylus. The resonance circuit emits radiation which can be detected by the conductors. The exact position and unique identity of the stylus can then be determined by the detector as a result of processing the signals sensed by the sensor.

For further information see U.S. provisional patent application 60/406,662 (sub-chapter 4.5 entitled: "Stylus") and corresponding U.S. patent application Ser. No. 10/649,708 filed Aug. 28, 2003, both assigned to N-Trig. Ltd. the contents of both of which are hereby incorporated by reference.

Algorithms

In the preferred embodiments of the present invention the basic detection operation cycle consists of averaging, decay compensation, windowing, FFT/DFT, peak detection, interpolation, error compensation, filtering and smoothing. The cycle is substantially the same whether a finger touch or a stylus is being detected with the notable exception that, as disclosed hereinbelow, the sources of noise and thus the types of appropriate error compensation differ.

For further information see U.S. provisional patent application 60/406,662 (sub-chapter 4.6 entitled: "Algorithms") and corresponding U.S. patent application Ser. No. 10/649, 708 filed Aug. 28, 2003, both assigned to N-Trig. Ltd. the contents of both of which are hereby incorporated by reference.

3. Finger Detection a. First Embodiment

This method utilizes an electromagnetic wave transmitted from either an external source or by the sensor components and received by the user body. When the user's finger touches the sensor the EM energy transfers from the user to the sensor. The detector processes the signal and determines the finger's position.

Figure 1B:
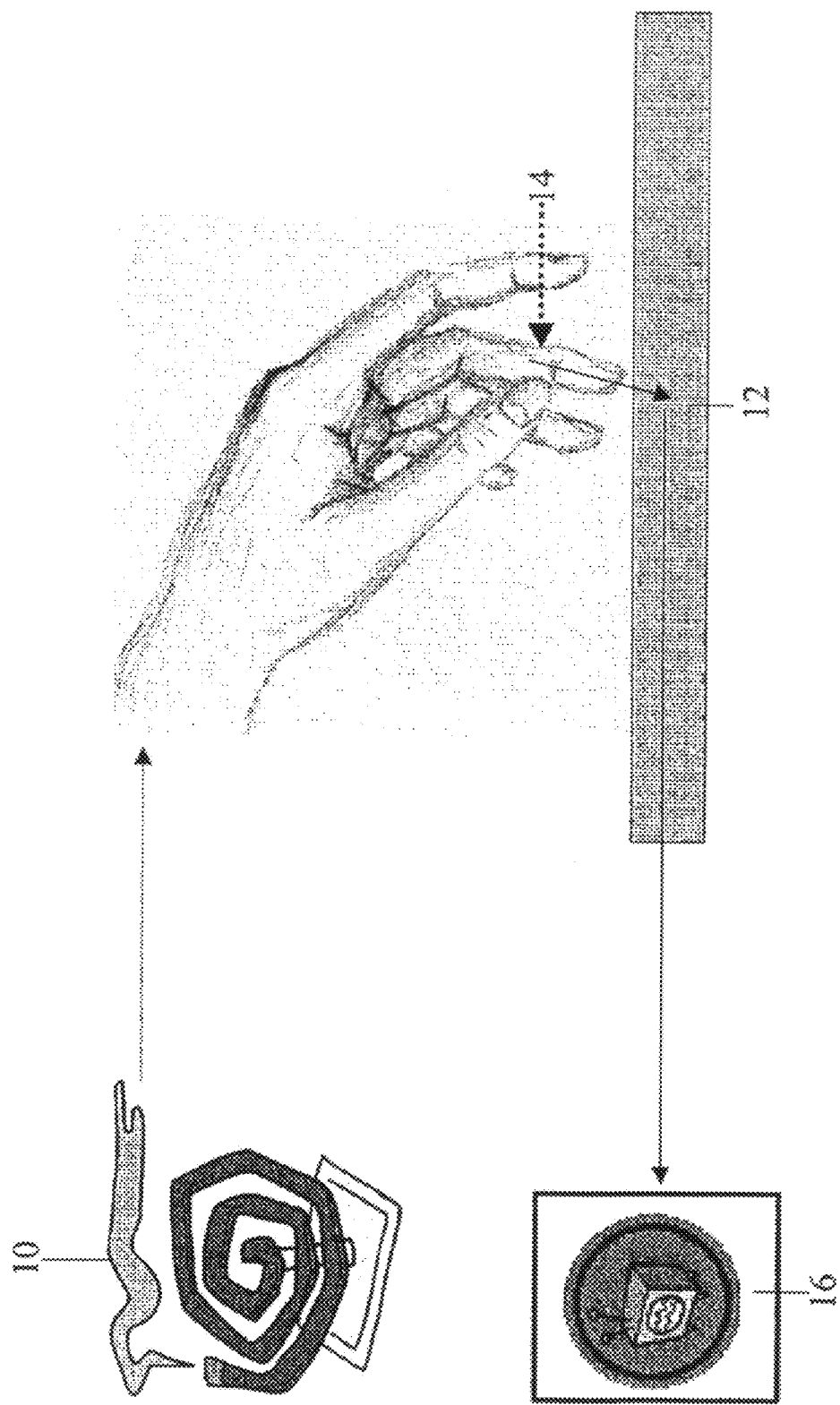
FIG. 1B is a simplified diagram illustrating an embodiment of the present invention in which oscillating energy is transmitted to a finger.

Reference is now made to FIG. 1B, which is a general description of a first finger detection apparatus according to the present invention. An external source 10 transmits electromagnetic wave energy, which is absorbed by the user's body. If the user now touches the sensor 12 a capacitance is formed between the finger 14 and the sensor conductors. The received signal is at a frequency that allows it to pass through the capacitance at the level typically formed, and thus the received signal passes from the user's finger 14 to the sensor 12. Detector 16, which processes the sensed signals, determines the position of the user's finger.

In a preferred embodiment, the external energy source is produced internally by the system using a dedicated transmitter. In other embodiments, the energy source could be a side effect of other parts of the system, such as transmission of a DC-to-DC converter, or even be background noise entirely unrelated to the system, such as electronic network noise.

In a preferred embodiment, the same sensor conductors that are used for sensing the EM stylus also sense the signal transmitted by the user's finger. Furthermore, the analog processing of the signals and the sampling of the signals is similar to that of the EM stylus and is performed by the same hardware, as explained elsewhere herein. In other embodiments, it may be more convenient to use different conductors for sensing the fingers and the stylus respectively, and thus additional electronics is added, alongside the stylus sensing arrangement, for processing and sampling the finger signals.

In a preferred embodiment both EM stylus signals and user finger signals are received and processed simultaneously so that both types of input can be detected at the same time. This is possible because, as explained elsewhere herein, the types of input signals from the sensors are essentially the same. In other embodiments, the system can alternate between detection of fingers and stylus.

The sensor requires a reference voltage level and a convenient reference is ground. In one embodiment of the present invention however, the sensor reference is dissociated with the electric network ground. The reason is that, whilst ground is used, the electric potential of the user body is close to the potential of the sensor reference and the signal that is sensed as a result is low. As the reference is moved away from ground the signal to be sensed is increased.

In other embodiments, especially if a dedicated transmitter is used, the sensor reference can nevertheless be connected to the ground of the electric network. That is to say, the system as a whole can be operated whether it is connected to the ground or not. However, when the system is connected to ground, it is preferable to use a dedicated transmitter. This is because, if a dedicated transmitter is not used on a grounded system then the signal resulting from a finger touch is weaker and therefore harder to detect.

The finger touch position is determined by processing the relative magnitude (and phase) of the signals that are detected on both axes, as will be explained in greater detail below. Accurate positioning is calculated by interpolation-type processing of the signals sensed by other conductors close to the point of finger touch.

In a preferred embodiment, the signals are transformed from the time domain to the frequency domain. If the energy received by the user's body is concentrated at a specific frequency, processing is carried out on that specific frequency, and other frequencies are simply ignored. Otherwise, processing may be performed on a group of frequencies.

In a preferred embodiment, different conductors are sampled at different time slots. It is assumed that the size of the time slots is chosen to be sufficiently small that the characteristics of the signal do not change over a few time slots. However, should the signal nevertheless change between successive measurements, such as when the finger receives random noise, then, in this embodiment, the measurement procedure changes and all conductive lines are sampled at the same time.

In a preferred embodiment, the energy transmission source is external to the sensor. In other embodiments, the energy is transmitted by one of the sensor components, for example the sensor excitation coil, the sensor matrix or any other conductor that is added to the sensor in order to specifically transmit the energy. In one embodiment it is possible to transmit the energy by alternating between a first transmitter that is orthogonal to one set of sensing conductors and a second transmitter that is orthogonal to the other set of conductors. Regarding the concept of a transmitter being orthogonal to a conductor, when transmitting from an antenna that is orthogonal to one conductor axis and parallel to the other conductor axis—signals received on the conductors that are in parallel are very strong, hence a signal induced by a finger is undetected. However, the conductors orthogonal to the transmitting antenna are hardly disturbed by it. Hence, a signal induced by a finger is detectable on the conductors that are orthogonal to the transmitting antenna. Now in all the preferred embodiments, electromagnetic (EM) stylus excitation is performed prior to sampling, whereas finger detection energy is transmitted during sampling. Consequently it is possible to produce both stylus excitation and finger excitation, that is to say transmission, signals using the same hardware, typically a signal generator. The two signals are simply transmitted by the same physical antennas at different time slots. Furthermore the stylus sampling procedure includes an excitation period and a separate sampling period which is subsequent to the excitation period. Thus, whilst the stylus is being sampled the antenna can already start to generate the signal for finger detection. Hence both objects can be sensed in the finger excitation phase. Alternatively, a stylus excitation signal generator may be provided as a separate unit from the finger detection signal generator.

In a preferred application the detector is capable of detecting multiple finger touches simultaneously. As long as different conductors sense different fingers the detection of multiple fingers is similar to detection of a single finger. However, if more than one finger is sensed by the same antenna than a higher signal magnitude is sampled on the respective antenna. The detector is simply required to process the magnitudes of the signals to distinguish the multiple finger touches.

Drawbacks to the first embodiment are:
  A dramatically reduced signal provided by the finger when the power supply of the system is grounded. This disadvantage makes a digitizer based thereon suitable mainly for devices powered by battery or those powered by a source highly isolated from the ground.

The need to transmit and therefore potentially interfere with other equipment.

Dependency on the distance from the user to the transmitter; meaning the further away the user is from the transmitter the lower is the signal. The resulting variation can lead to reliability problems.

b. Second Embodiment

The second embodiment does not require transmitting an EM signal to the user's body. Rather, even without the influence of an EM signal, the user's finger adds a capacitance that connects two orthogonal sensor lines.

Figure 2:
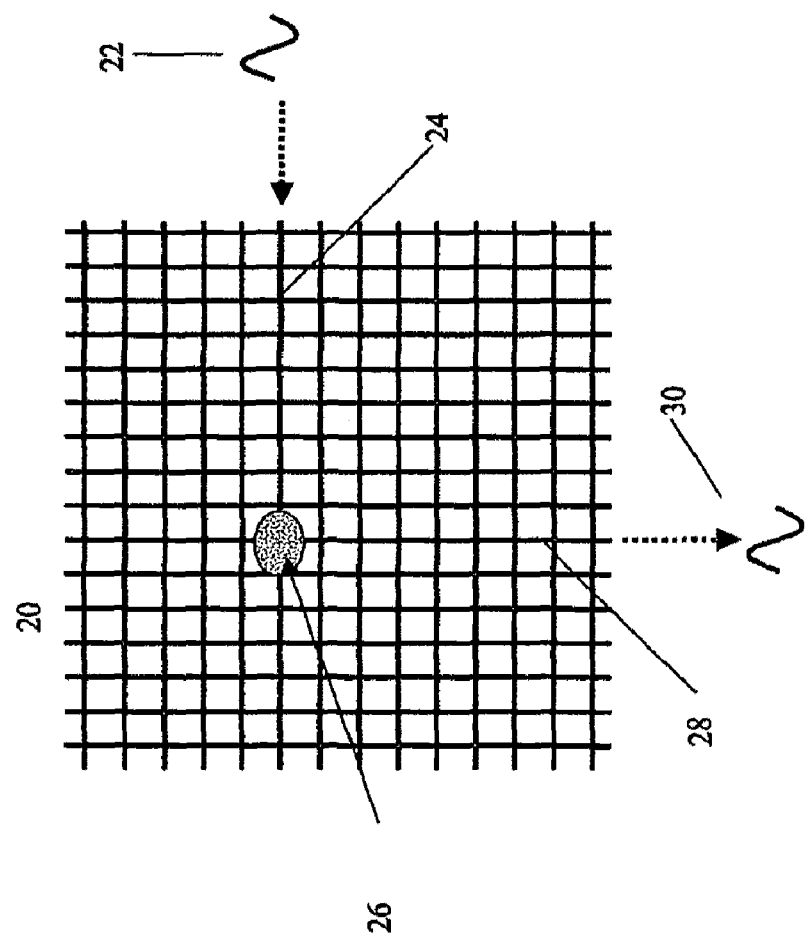
FIG. 2 is a simplified diagram illustrating an embodiment of the present invention in which the touching finger provides a capacitive link between sensing conductors on a grid.

Reference is now made to FIG. 2, which is a general description of the second finger detection embodiment of the present invention. A two-dimensional sensor matrix 20 lies in a transparent layer over an electronic display device. An electric signal 22 is applied to a first conductor line 24 in the two-dimensional sensor matrix 20. At each junction between two conductors a certain minimal amount of capacitance exists. A finger 26 touches the sensor 20 at a certain position and increases the capacitance between the first conductor line 24 and the orthogonal conductor line 28 which happens to be at or closest to the touch position. As the signal is AC, the signal crosses by virtue of the capacitance of the finger 26 from the first conductor line 24 to the orthogonal conductor 28, and an output signal 30 may be detected.

It will be appreciated that depending on the size of the finger and the fineness of the mesh of conductors, any number of the orthogonal conductors will receive some capacitive signal transfer, and interpolation of the signal between the conductors can be used to increase measurement accuracy.

It will also be appreciated that a capacitive coupling of this nature typically introduces a phase shift in the signals. The significance of the phase shift will be discussed in greater detail below.

Figure 3:
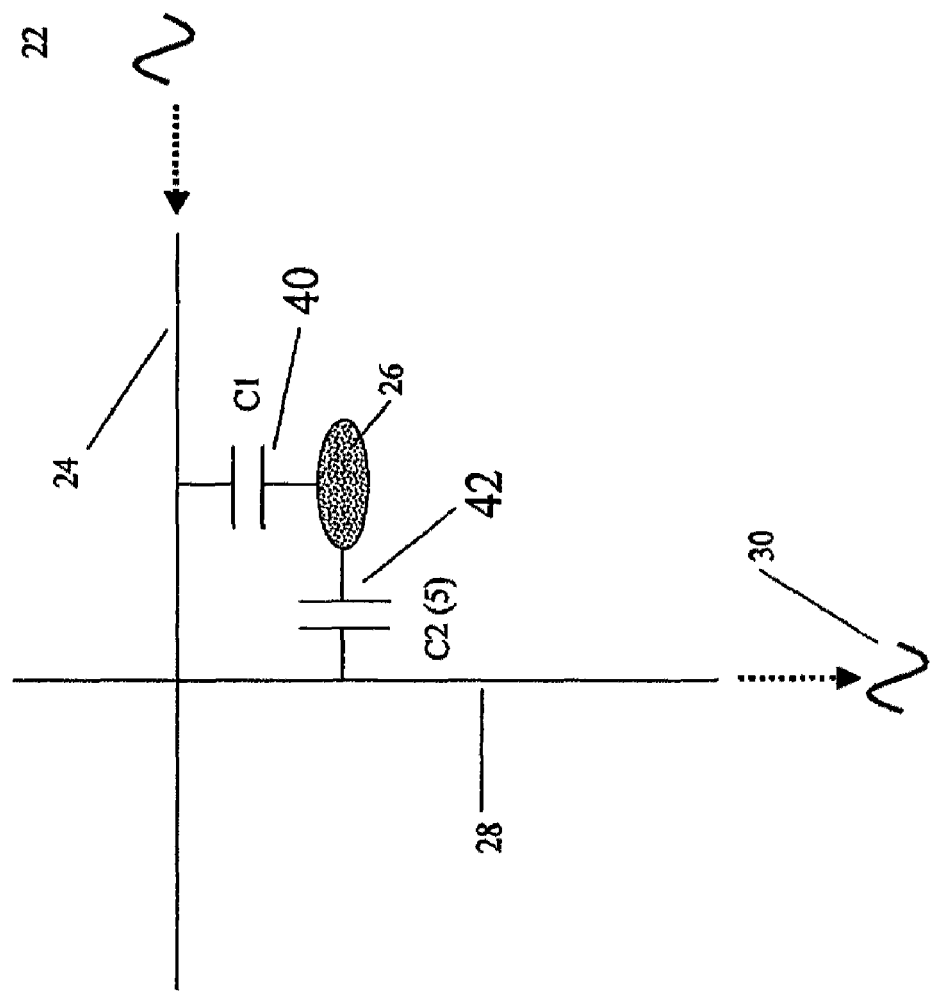
FIG. 3 is a circuit diagram illustrating the electrical theory of the embodiment of FIG. 2.

Reference is now made to FIG. 3, which is the theoretical electric equivalent of FIG. 2. Parts that are the same as in previous figures are given the same reference numerals and are not referred to again except as necessary for understanding the present embodiment. The transmitted signal 22 is applied to the Horizontal conductor 24. The finger 26 that touches the sensor creates two capacitors, C1 40 and C2 42 that transfer the signal from the horizontal line to the finger and from the finger to the vertical conductor 28. An output signal 30 is detected on the edge of the vertical conductor in the case of finger touch.

In a preferred embodiment, the two-dimensional matrix of conductors used for sensing the stylus is the same one used for sensing the fingers. Each conductive line is used for reception of both stylus signals and finger signals. Each one of the lines can serve either for reception or for injection of signals. The detector controls the switching of the sensor conductors between reception and transmission modes.

Each horizontal conductor overlaps with each vertical conductor, and the regions of overlap between horizontal and vertical conductors also result in a certain amount of parasitic capacitance. Furthermore the individual junctions may give rise to different levels of capacitance. The capacitance causes a small amount of signal transfer between the conductors even if no finger is present. In a preferred embodiment, the detector actually learns the amount of parasitic current transfer for each individual junction and subtracts this value from the sampled signals.

The goal of the finger detection algorithm, in this method, is to recognize all of the sensor matrix junctions that transfer signals due to external finger touch. It should be noted that this algorithm is preferably able to detect more than one finger touch at the same time.

A number of procedures for detection are possible. The most simple and direct approach is to provide a signal to each one of the matrix lines in one of the matrix axes, one line at a time, and to read the signal in turn at each one of the matrix lines on the orthogonal axis. The signal, in such a case, can be a simple cosine pattern at any frequency within the range of the sampling hardware and detection algorithms. If a significant output signal is detected, it means that there is a finger touching a junction. The junction that is being touched is the one connecting the conductor that is currently being energized with an input signal and the conductor at which the output signal is detected. The disadvantage of such a direct detection method is that it requires an order of n*m steps, where n stands for the number of vertical lines and m for the number of horizontal lines. In fact, because it is typically necessary to repeat the procedure for the second axis so the number of steps is more typically 2*n*m steps. However, this method enables the detection of multiple finger touches. When an output signal is detected on more then one conductor that means more than one finger touch is present. The junctions that are being touched are the ones connecting the conductor that is currently being energized and the conductors which exhibit an output signal.

A faster approach is to apply the signal to a group of conductors on one axis. A group can comprise any subset including all of the conductors in that axis, and look for a signal at each one of the conductors on the other axis. Subsequently, an input signal is applied to a group of lines on the second axis, and outputs are sought at each one of the conductors on the first axis. The method requires a maximum of n+m steps, and in the case in which the groups are the entire axis then the number of steps is two. However, this method may lead to ambiguity on those rare occasions when multiple touches occur simultaneously at specific combinations of locations, and the larger the groups the greater is the scope for ambiguity.

An optimal approach is to combine the above methods, starting with the faster method and switching to the direct approach upon detection of a possible ambiguity.

c. Third Embodiment

The third embodiment uses a potential difference between the user's finger and the system to determine the finger position.

Figure 4:
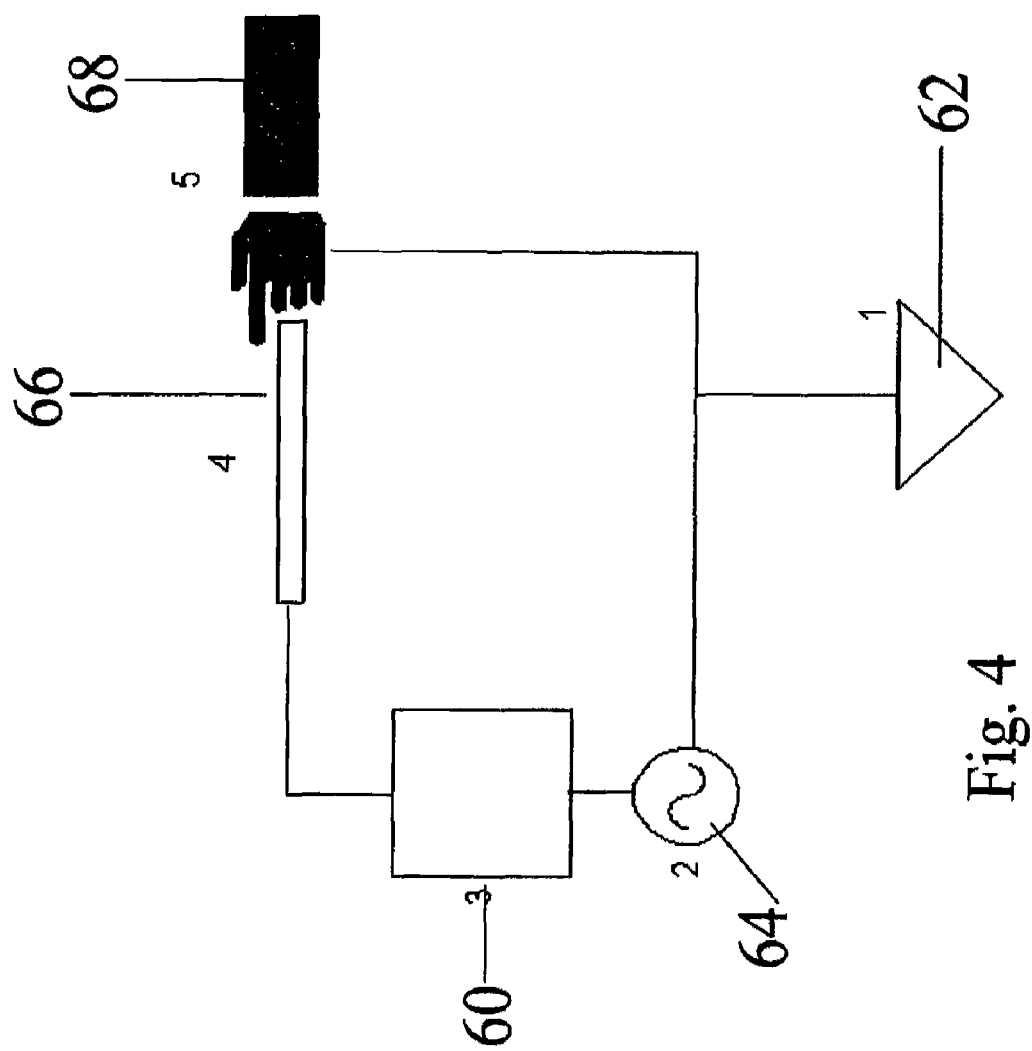
FIG. 4 is a simplified schematic diagram illustrating an embodiment of the present invention in which the detection device is floated using a signal that oscillates with respect to a reference signal and wherein a finger incident upon a conductor provides a capacitive path to ground.

Reference is now made to FIG. 4, which is a simplified schematic diagram illustrating the third preferred embodiment of the finger detection of the present invention. A detector 60 is connected to ground 62. The detector is connected to an oscillator 64 that provides an alternating signal which can cause the detector potential to oscillate with respect to ground potential. The oscillating potential is applied to sensor 66.

In operation the detector 62 oscillates in reference to the common ground potential. As a user's finger 68 touches the sensor 66, a capacitance is formed between the finger and the sensor conductors. Now the user's body potential does not oscillate in reference to earth while the sensor's potential does oscillate in reference to the common ground potential. Thus an alternating difference in potential between the sensor and the user is formed. An alternating current therefore passes from the sensor through the finger to the ground. The current is interpreted as a signal that passes from the user's finger 68 to the sensor 66. The detector 62 processes the sensed current and determines the location of the user's finger according to the magnitude, that is the signal level, on certain sensor conductors. More particularly, since there is a potential difference between the sensor and the finger, which we denote V, and the finger touch itself induces a capacitance C, there is a charge transfer between the finger and conductor of magnitude Q=C*V. The charge transfer may be inferred from the current on the conductive line.

The common ground may be the electric network ground, but the method works also when the system is not actually connected to earth but rather to a common ground of several systems, such as that of a flat panel display, tablet PC, etc. These systems have sufficient capacity to allow the detector to oscillate in reference to the common ground.

It should be noted that in some embodiments the system constantly oscillates in reference to the common ground but in a preferred embodiment it only oscillates over a portion of the time, namely only when signals are actually being received and processed by the detector. In other words, if there are no incoming signals to be digitized, then the system saves energy by not operating the oscillator.

Figure 5:
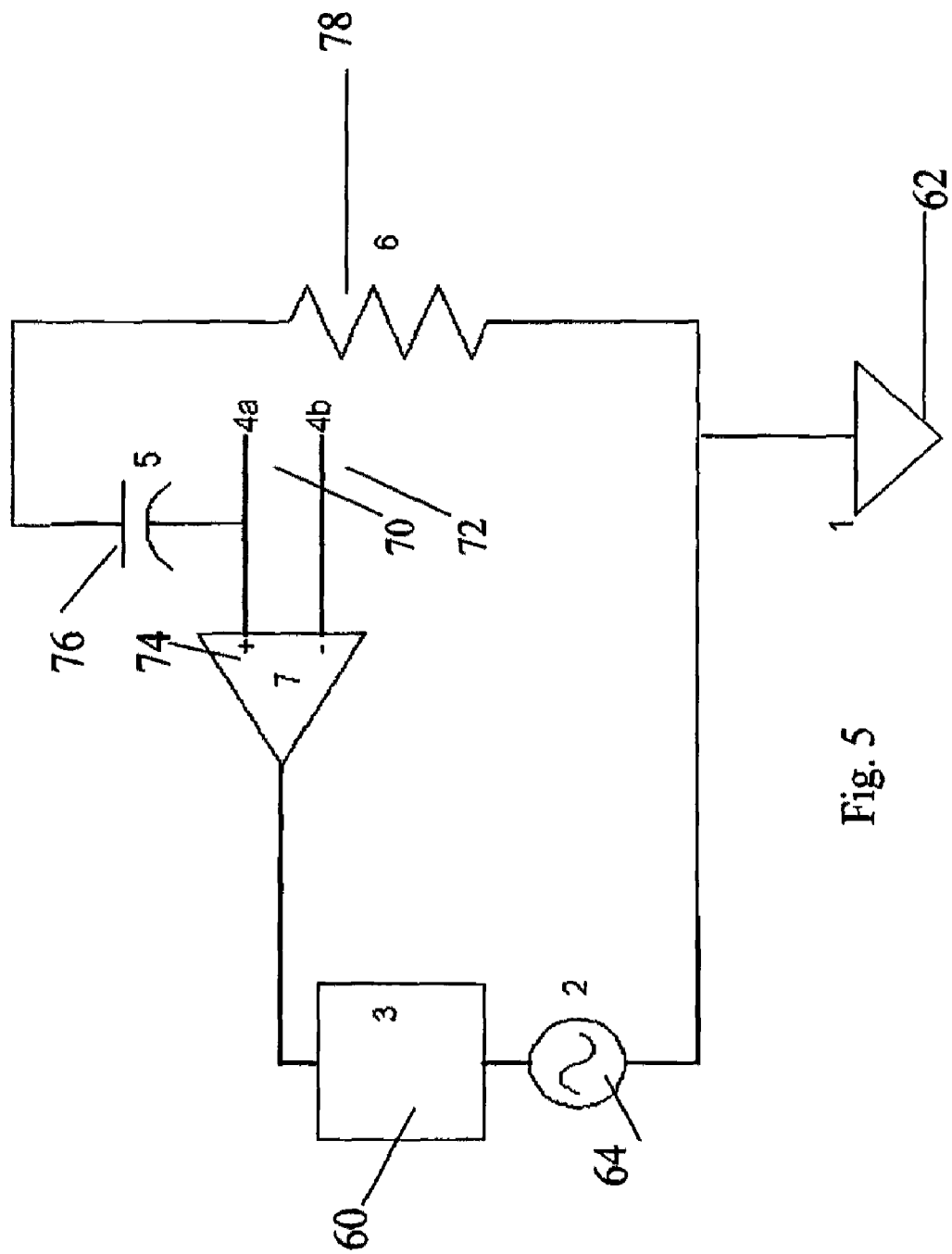
FIG. 5 is a circuit diagram illustrating one version of the embodiment of FIG. 4.

Reference is now made to FIG. 5, which is a circuit diagram of an implementation of the embodiment of the present invention described in FIG. 4. Parts that are the same as in FIG. 4 are given the same reference numerals and are referred to only as necessary for understanding the theory of the operation of the embodiment. In FIG. 5, oscillator 64 is connected between ground 62 and detector 60. The oscillator 64 oscillates the detector 60 and the detector front end, which includes two sensor conductors 70 and 72. The two conductors are connected to the two differential inputs respectively of differential amplifier 74. As explained above, all oscillations are in reference to the common ground 62. The touch by the user's finger of a sensor conductor, say 70 creates capacitance 76. As there is a potential between conductor 70 and the user, current passes from conductor 70 through the finger to ground. Impedance 78 indicates the impedance of the finger. Consequently a potential difference is created between conductors 70 and 72. Preferably, the separation between the two conductors 70 and 72 which are connected to the same differential amplifier 74 is greater than the width of a finger so that the necessary potential difference can be formed. The differential amplifier 74 amplifies the potential difference, and the detector 60 processes the amplified signal and thereby determines the location of the user's finger. It should be noted that in alternative embodiments the sensor may be connected to a standard amplifier rather than to a differential amplifier.

It is noted that were the oscillator not used and a d.c. current produced, no measurable potential difference would be produced by the touch of the finger since the touch of the finger induces a capacitance, and thus has no effect on d.c. current.

In one embodiment of the present invention, as described above, the entire detector is oscillated in reference to the common ground. A disadvantage of this option is that any communication between the detector and the outside word, such as serial communication to the host computer, must be adapted to compensate for the potential difference between the detector and the outside world and cannot use a common ground. There are numerous ways of communicating between components that have to be isolated from each other, and one example for a way to provide isolated communication is by using an optical link. The optical link transforms the electrical signal into light and than back into an electrical signal, and the level of isolation is very high. However the need for isolation can also be overcome by applying the oscillation to only a portion of the detector.

Figure 6:
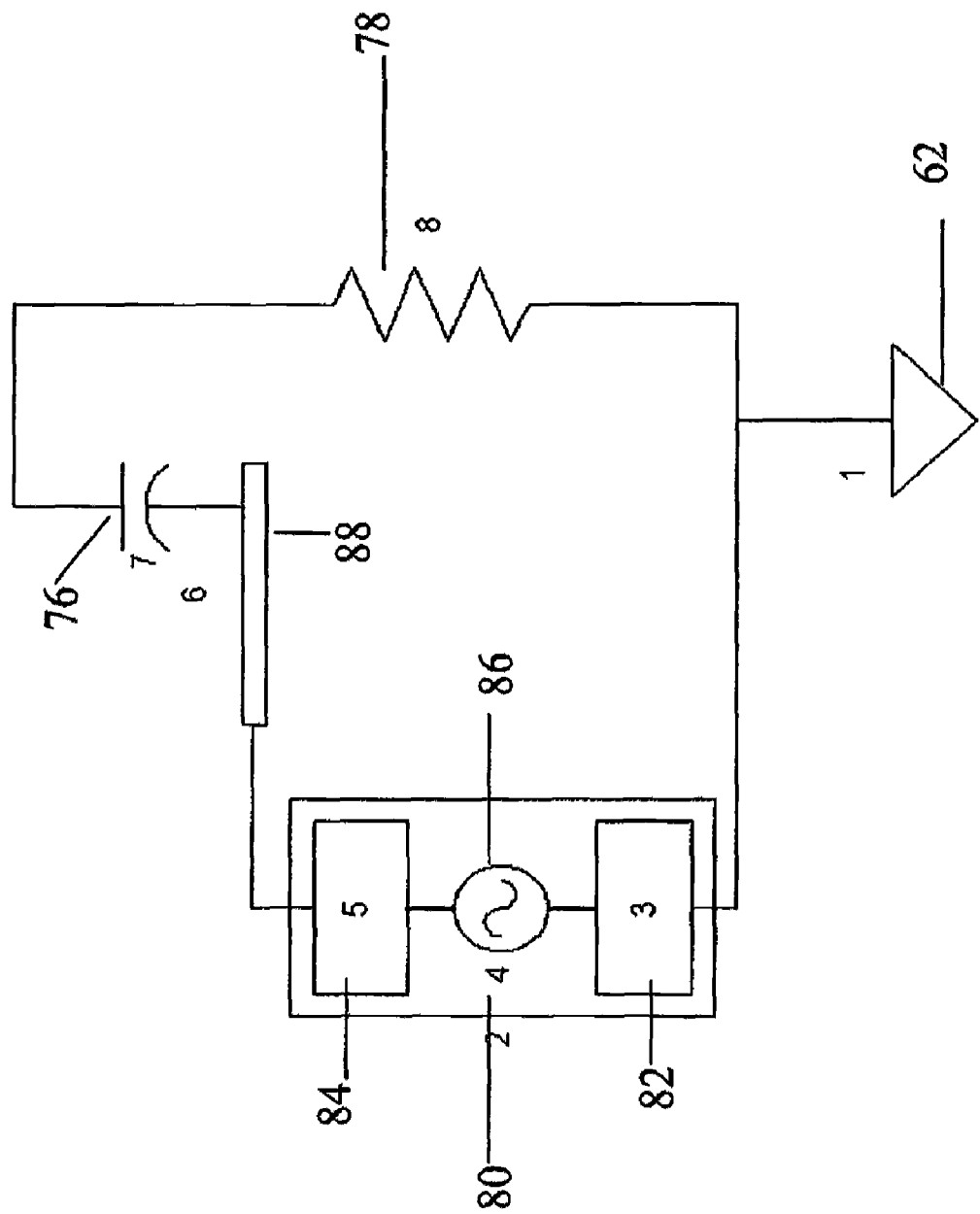
FIG. 6 is a circuit diagram illustrating a variation of the embodiment of FIG. 4.

Reference is now made to FIG. 6, which is a theoretical circuit diagram illustrating a detector to which oscillation is only partly provided. Parts that are the same as in previous figures are given the same reference numerals and are not referred to again except as necessary for understanding the present embodiment. Detector 80 is the same as detector 60 except that it is divided into two units: 82 and 84. Oscillator 86 is located between the two units 82 and 84 within the detector 80.

The oscillation states of the components of the detector are as follows:

1) Unit 82 of detector 80 does not oscillate in reference to the common ground 62.

2) Unit 84 of the detector oscillates in reference to the common ground. Unit 84 includes the front end of the detector. It may also include any other components of the detector.

Sensor device 88 also oscillates in reference to the common ground, by virtue of its being connected to the detector front end, which is part of unit 84. In the present figure, the sensor device refers to the transparent film carrying the matrix of sensors.

Using the embodiment of FIG. 6, which entails dividing the detector into two units, is an option available to the skilled person to be selected in any given circumstances with regard to efficiency, convenience and costs.

When a user's finger touches the sensor conductors within sensor device 88, a capacitance 76 is created, as described above. The sensor detects signals induced by the user's finger on the different sensor conductors. The detector 80, which includes detector units 82 and 84, processes the sensed signal and determines the location of the user's finger.

In the present embodiment, the steady portion 82 of the detector 80 conducts communication to the external world without the need for any kind of isolation.

An additional advantage of the present embodiment is that using oscillations increases power consumption. Partial application of oscillation therefore leads to lower overall power consumption within the system.

A requirement of the present embodiment is to provide communication between the two units of the detector since, as explained above, one oscillates in reference to the other. The problem can be solved in a number of ways, for example using the following alternatives:

1. Using differential signals, so that data is output on two parallel lines, one a signal and one a reference. Both the signal and its reference oscillate but the data is in fact carried in the difference between the two. The embodiment is described in greater detail hereinbelow with reference to FIG. 10b, under the heading 'floating the system'.

2. Using electrically isolated communication within the detector, such as opto-isolators 3. Limiting the communication to time slots in which the front-end section does not oscillate in reference to the other part of the system, or is at a stage in the oscillation when the two are in equilibrium.

Figure 7:
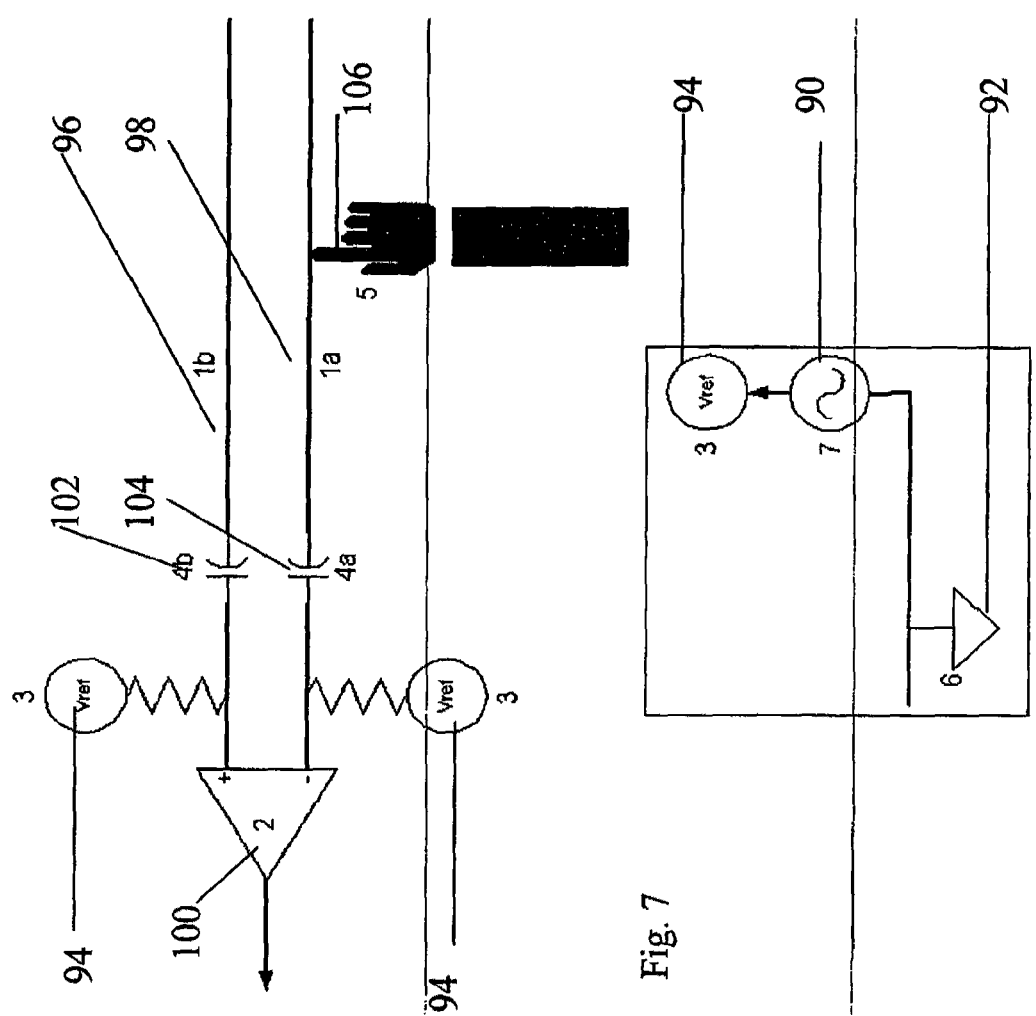
FIG. 7 is a circuit diagram illustrating another variation of the embodiment of FIG. 4, in which the conductors are oscillated directly.

Reference is now made to FIG. 7, which is a simplified circuit theory diagram illustrating a preferred embodiment of the present invention. In the embodiment of FIG. 7, oscillations are applied to the sensor, specifically to the conductors in the sensor, and not to the detector.

In FIG. 7, an oscillator 90 provides an oscillating signal with reference to ground 92. The oscillating signal is provided as a reference signal Vref to the sensor, and specifically to individual conductors in the sensor, which is to say that Vref 94 is provided to each conductor individually.

In the figure, two sensor lines 96 and 98 are shown connected to the differential inputs of a single differential amplifier 100. Capacitors 102 and 104 are connected between the respective sensor line and the corresponding differential input. Finger 106 is then applied to one of the conductors.

In the embodiment of FIG. 7, the reference signal Vref 94 is applied to each conductor at the output end, that is at the connections to the differential amplifier 100, and more specifically on the amplifier side of the isolation capacitors 102, 104. Thus excitation and sampling are performed at the same end of the conductor, which is the input to the differential amplifier.

In use an oscillation is applied to the sensor conductors by oscillating the reference voltage Vref 94 supplied to the sensor.

The oscillator 90 oscillates Vref 94 with respect to common ground 92. Conductors 96 and 98 therefore also oscillate with regard to the network ground. Capacitors 102 and 104 filter irrelevant low frequencies from conductors 96 and 98 respectively. As long as the user does not touch the sensor the signals received by both inputs of the differential amplifier are similar and therefore no output is generated. When the user's finger 106 touches conductor 98, a capacitance is created between the user's finger 106 and conductor 98 just as before. Both the amplitude and phase of the signal propagating through the touched conductor is altered due to the added capacitance. The potential difference between conductor 98 and conductor 96 is amplified by the differential amplifier 100 and then processed by the detector in order to determine the location of the user's finger.

Figure 8:
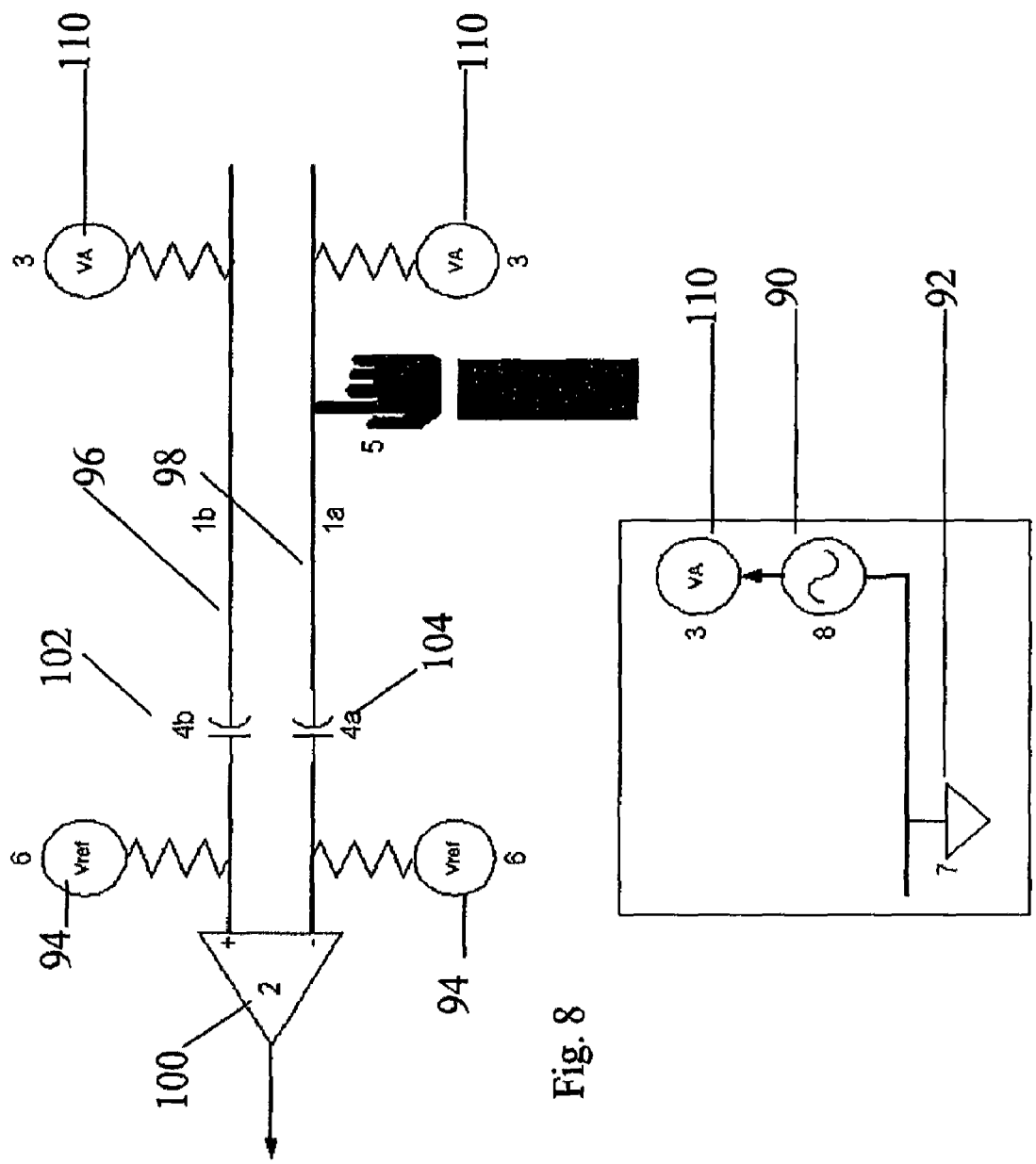
FIG. 8 is a circuit diagram illustrating a variation of the embodiment of FIG. 7 in which the conductors are oscillated from their far ends.

Reference is now made to FIG. 8, which is a simplified diagram illustrating a variation of the embodiment of FIG. 7. Parts that are the same as in FIG. 7 are given the same reference numerals and are not referred to again except as necessary for understanding the present embodiment. The embodiment of FIG. 8 differs from FIG. 7 in that two reference signals are used, an oscillation reference signal Va is applied to the conductors on the ends extending into the sensor opposite to where detection is carried out, that is away from the inputs to the differential amplifier. A DC reference signal is applied to the output side of the conductors and is used to create a high reference level for the conductive lines. Other embodiments may not include a separate DC reference signal Vref, and rely on Va alone. Vref as used in the present embodiment, creates a high reference level for the conductors. That is to say, since the input resistance to the amplifier is very high the conductors are susceptible to noise from the environment. Connecting the conductors to a higher reference level eliminates, or at least reduces, their tendency to pick up noise. In the embodiment of FIG. 7, the Vref signal is used both for oscillating the conductive lines and setting the DC level. In the embodiment of FIG. 8 it is both clarified that the oscillations can be applied opposite to the detecting end of the conductor and that the oscillation and DC reference signals can be separated. It is further noted that it is possible to apply Va—without use of a separate Vref signal.

In use, an oscillation is applied to the sensor conductors by oscillating the reference voltage Va 110 supplied to the sensor.

The oscillator 90 oscillates Va 110 with respect to common ground 92. Conductors 96 and 98 therefore also oscillate with regard to the network ground. Capacitors 102 and 104 filter irrelevant low frequencies from conductors 96 and 98 respectively. As long as the user does not touch the sensor the signals received by both inputs of the differential amplifier are similar and therefore no output is generated. When the user's finger 106 touches conductor 98, a capacitance is created between the user's finger 106 and conductor 98 just as before. Both the amplitude and phase of the signal propagating through the touched conductor are altered due to the added capacitance.

The potential difference between conductor 98 and conductor 96 is amplified by the differential amplifier 100 and then processed by the detector in order to determine the location of the user's finger.

Floating the System

In order to enable oscillations of the system or part thereof, in reference to the common ground, the system or part thereof preferably has a certain level of isolation from the ground. The better the level of isolation, the lower is the power lost due to the oscillations.

Figure 9:
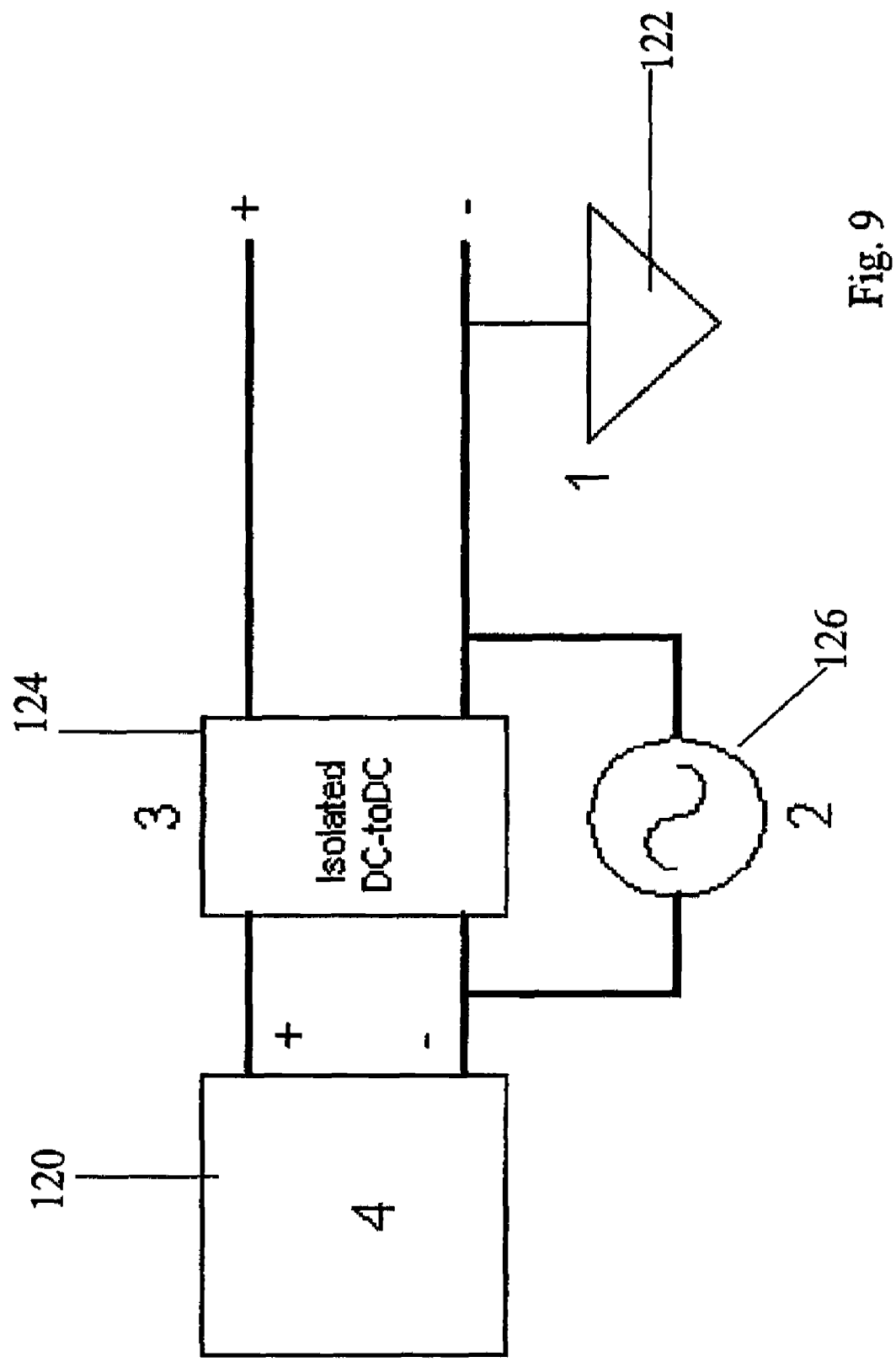
FIG. 9 is a block diagram of a variation of the embodiment of FIG. 4 in which isolation is provided by a DC to DC converter.

Reference is now made to FIG. 9, which is a simplified diagram illustrating an arrangement for floating the detection system of the present embodiments using an isolated DC-DC converter. In FIG. 9, Detector 120 is connected to ground 122 via isolated DC-DC converter 124. Oscillator 126 provides a reference voltage to isolated detector 120 so that it oscillates.

Figure 10A:
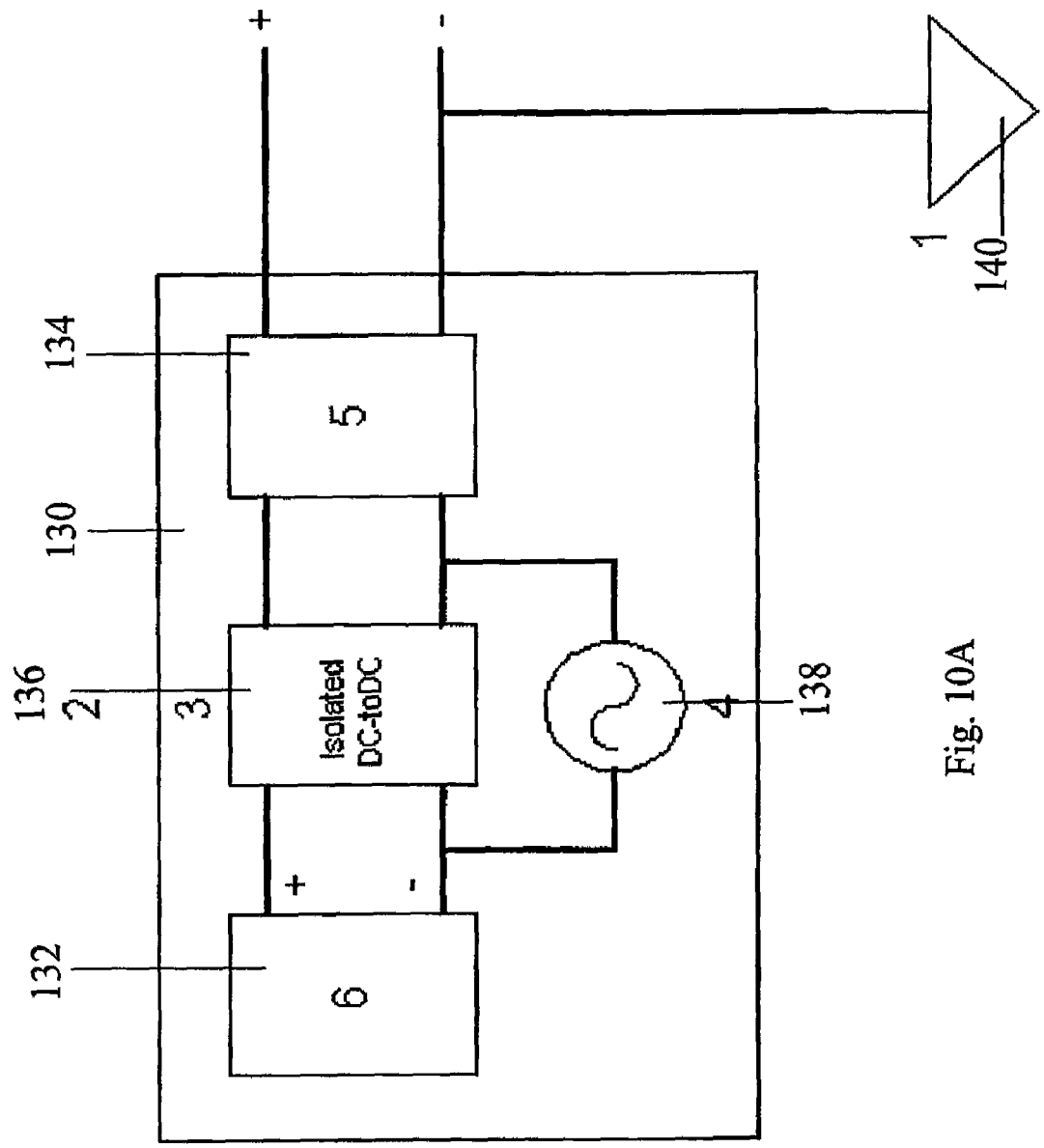
FIG. 10A is a block diagram illustrating another variation of the embodiment of FIG. 4 in which isolation by a DC to DC converter is provided between two parts of the detector.
Figure 10B:
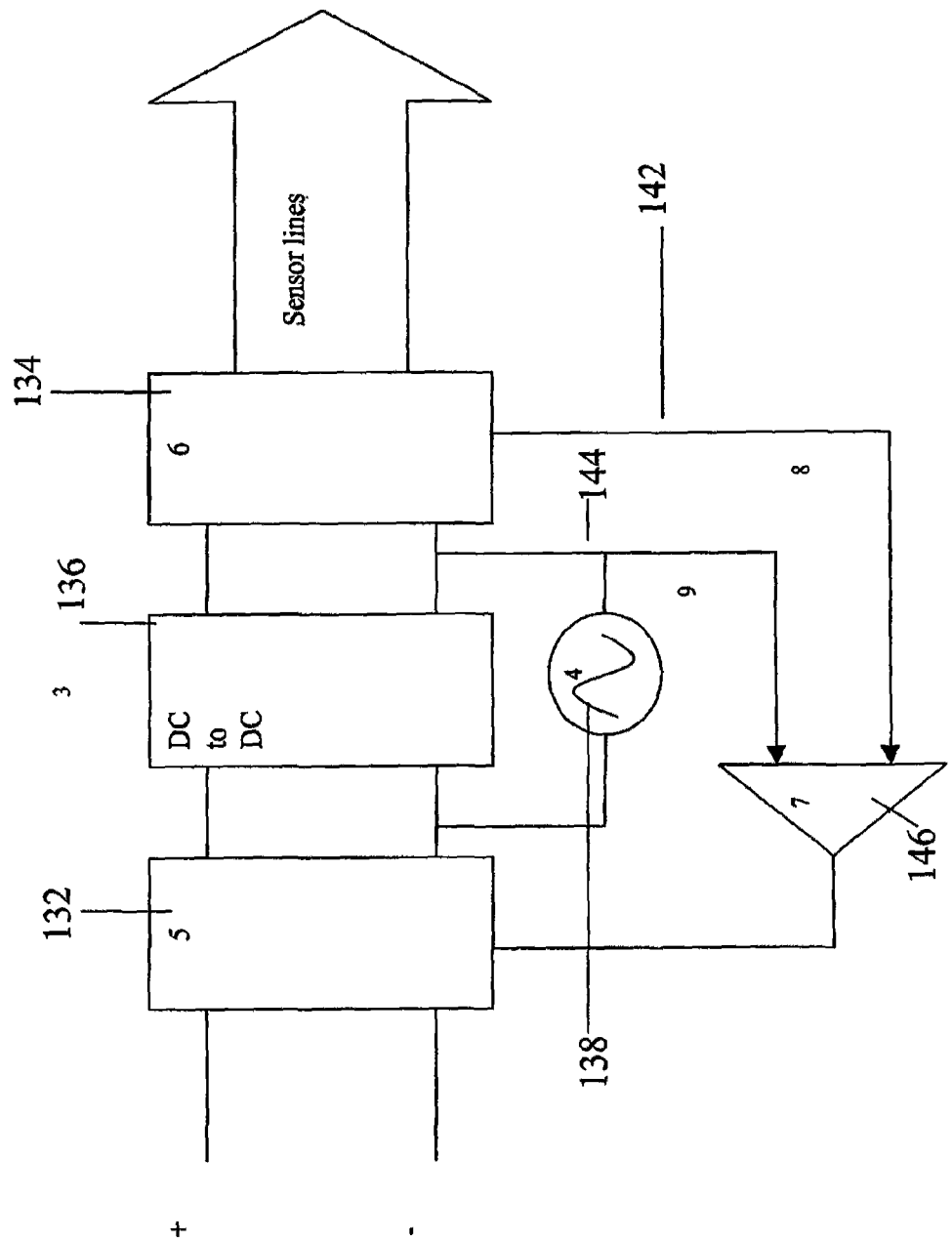
FIG. 10B is a block diagram illustrating a modification to the embodiment of FIG. 10A to permit communication between the two parts of the detector.

The DC-to-DC floating method may be modified so that only a portion of the detector oscillates in reference to the ground. Two such modifications are illustrated in FIGS. 10A and 10B respectively. Referring first to FIG. 10a, the detector 130 comprises two units 132 and 134. Due to the isolated DC-to-DC component 136 the detector component 134 floats in reference to the ground and the oscillator 138 oscillates detector unit 134 in reference to the common ground 140.

A communication problem between the two detector units 132 and 134 arises, since one of the detector units 134 oscillates whereas the other detector unit 136 does not.

Reference is now made to FIG. 10b, which illustrates a possible solution to overcome the above-described communication problem. Parts that are the same as in FIG. 10A are given the same reference numerals and are not referred to again except as necessary for an understanding the present embodiment. Detector unit 134 floats in reference to the ground and oscillates, due to oscillator 136. The output signals of detector unit 134 oscillate in relatively the same phase as oscillator 136. Output signal 142 from detection unit 134 and the oscillator output 144 are inserted to a differential amplifier 146. The potential difference between signals 142 and 144 is amplified by the differential amplifier 146. The output signal of differential amplifier 146 is a steady signal representation of signal 142. Thus, detecting units 132 and 134 can communicate through differential amplifier 146, which serves as a communication device or channel.

Reference is now made to FIG. 11, which is an embodiment utilizing coils for isolating the system. Generally, coils have low impedance for low frequencies and high impedance for high frequencies. A power supply is provided to the isolated portion using low frequencies, such as close to DC, but the coils manage to isolate higher frequencies such as those used for oscillating the detector. In FIG. 11, detector 150 is isolated from its power supply, and common ground 152, using two coils 154 and 156. Oscillator 158 oscillates detector 150 in reference to the common ground.

Reference is now made to FIG. 12, in which the floating coil method is implemented such that only a part of the detector oscillates in reference to the common ground. Detector 160 is divided into two units: 162 and 164. Unit 162 is isolated from its power supply and common ground 166 using two coils 168 and 170 and the oscillator 172 oscillates unit 162 in reference to the common ground.

Figure 13:
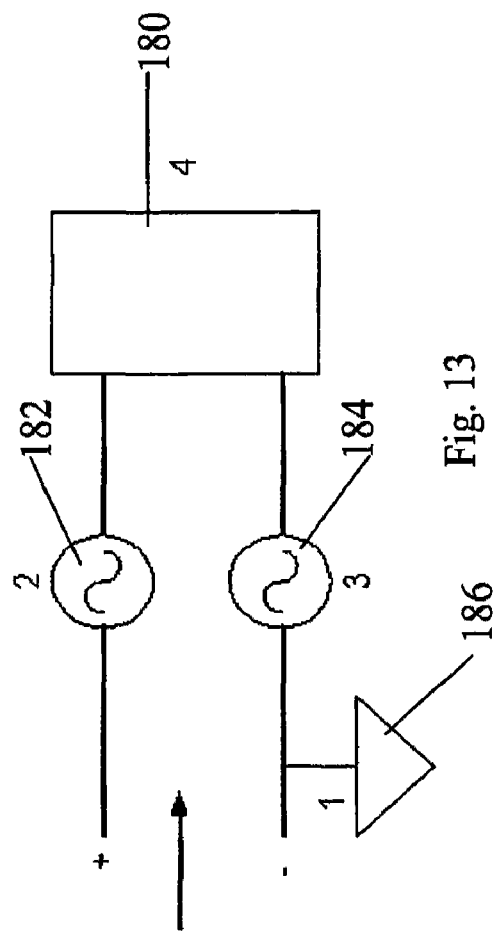
FIG. 13 is a block diagram illustrating floating of the detector by placing tandem oscillators on the positive and ground power supply rails.

Reference is now made to FIG. 13 which illustrates an additional method for applying oscillations to the system or part thereof, in reference to the common ground. In the embodiment of FIG. 13, a detector 180 is connected to a first oscillator 182 and a second oscillator 184. The first oscillator is connected to the +power supply line and the second oscillator to the earth line. In use, the detector unit, to which oscillations are applied, is not isolated and neither is it left floating. Rather the second oscillator 184 oscillates at the low potential of the system (VSS) in reference to the common ground 186 and the first oscillator 182 oscillates at the high potential of the system (VCC) in reference to the power supply DC level. As long as the two oscillators are synchronized, both in phase and magnitude, the detector, or a portion of the detector, oscillates in reference to the common ground.

The Oscillator

As explained hereinabove, the various preferred embodiments of the present invention utilize an oscillator to provide a transmission signal, or oscillate the detector, a part of the detector or some or all of the sensor's conductors. The following section explains several options for the implementation of such an oscillator.

One preferred embodiment utilizes a stand-alone oscillator. Such a stand-alone oscillator is capable of oscillating either at a single frequency, or at a varying frequency, which, in the latter case, is determined by a DSP component of a digital unit associated with the digitizer system.

An additional embodiment utilizes the DSP itself for creating the oscillations. One advantage of this option is that the phase of the oscillations can be easily synchronized for sampling. In this case DSP digital values are provided to a D2A (Digital to Analog) component, or any equivalent arrangement, and then the analog values are filtered and amplified as required. An additional version of such an implementation may utilize for the production of oscillations the same components that are being used for the excitation of the stylus. For further details on the excitation of the stylus see FIG. 9 in U.S. provisional patent application 60/406,662, and the corresponding description, entitled "Stylus. The figure and corresponding description are hereby incorporated herein by reference.

The same components can be used for both stylus excitation and finger sampling for the following reasons:

The finger is detected only during dedicated sampling periods, and

No excitation is performed during the dedicated sampling periods.

Figure 14:
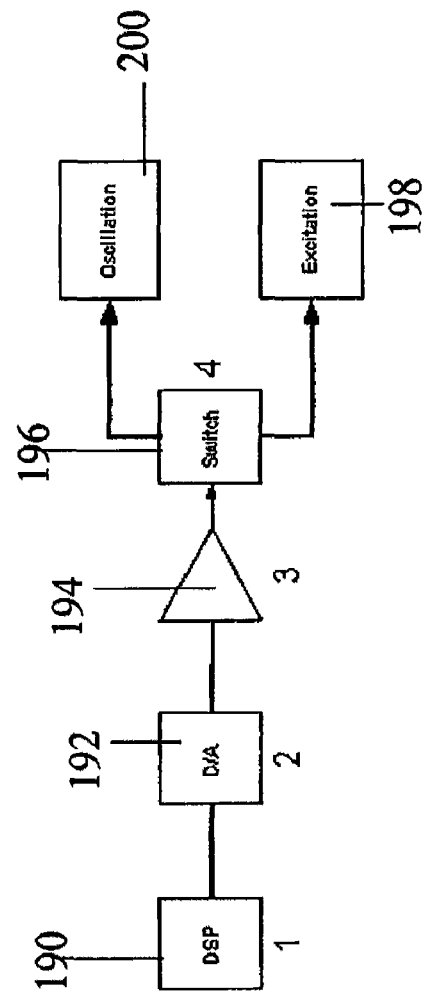
FIG. 14 is a simplified block diagram illustrating how the same excitation circuitry can be used for stylus and finger touch sensing according to a preferred embodiment of the present invention.

Reference is now made to FIG. 14, which is a simplified diagram that demonstrates the above-described use of the stylus excitation components in order to implement the oscillator. DSP 190 produces a digital signal. D/A converter 192 converts the signal to an analog representation. Amplifier 194, connected downstream of the D/A converter, amplifies the analog signal and a switch 196 sends the signal either to an exaction coil 98 for exciting the stylus, or to an oscillation output 200 for providing an oscillation signal as required for the respective embodiment. It should be noted that the switch can be located prior to the amplifier if different levels of amplification/output impedance are required for the two tasks.

The Irrelevant "Steady Noises" Problem, and its Solution

The Display Panel Irrelevant "Steady Noises" Problem

Figure 15:
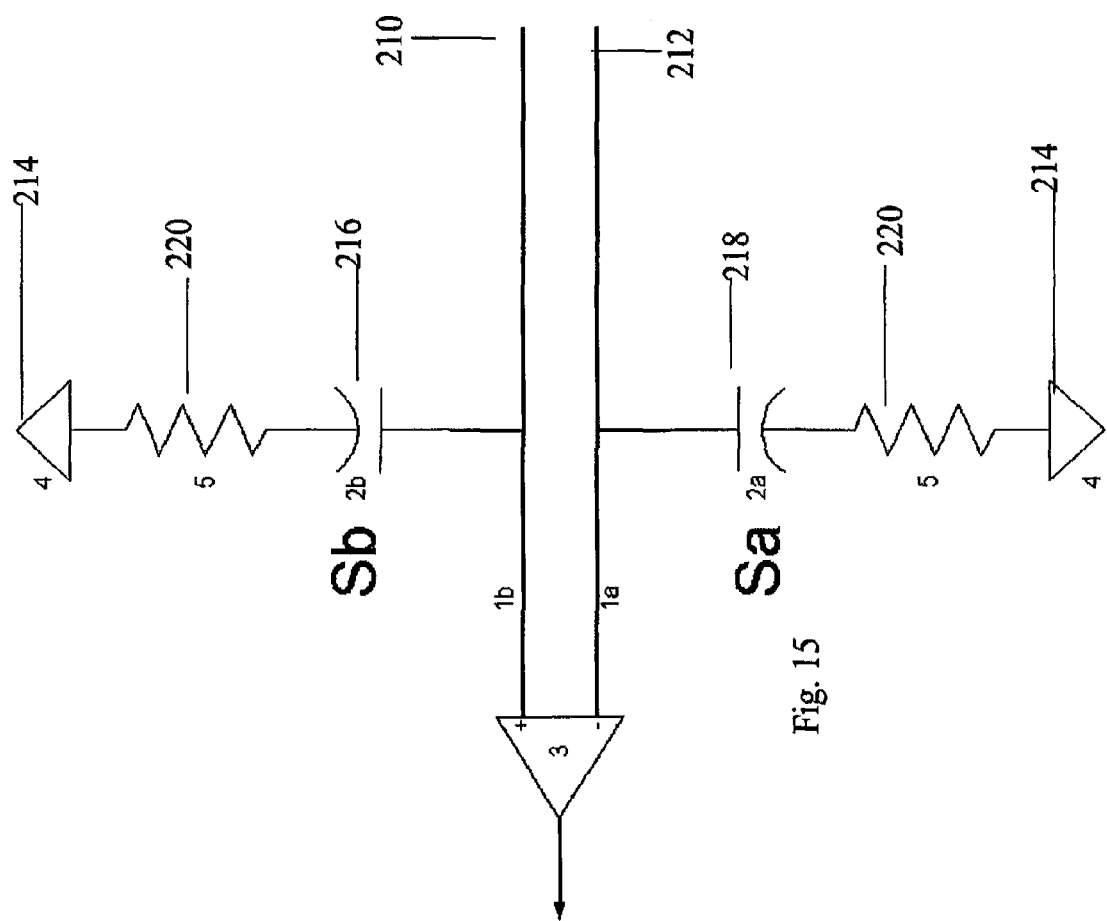
FIG. 15 is a theoretical circuit diagram illustrating sources of steady state noise that affect touch measurements in the present embodiments.

Reference is now made to FIG. 15, which is a simplified diagram which demonstrates what may be referred to as the display panel signal problem. Two sensor conductors 210 and 212 oscillate in reference to ground 214 by virtue of any of the above embodiments. As mentioned above, the sensor is located over an electronic display. Capacitances 216 and 218 are created between conductors 210 and 212 and the display panel 220. As the display panel, represented electrically by resistances 220, does not oscillate in reference to the common ground 214 two signals, (Sa) and (Sb), which may be regarded as oscillating leakage currents, are provided on conductors 210 and 212 respectively.

As long as the oscillation phase and magnitude do not change (Sa) and (Sb) remain identical over time. Sa and Sb are thus referred to herein as steady noises. It is noted that the parasitic capacitance between the sensor and the display can also change due to environmental conditions etc. This may affect the signal as well.

In an ideal environment, (Sa)=(Sb), and therefore no signal differentiation is amplified, by differential amplifier 222 which is connected between the two sensors 210 and 212, unless a user's finger touches a conductor. However, in practice, there are slight differences in distance, overlapping area, screen structure, intermediate material, temperature, etc. (Sa) ≠(Sb), and therefore, a "steady noise": (Sa)–(Sb) is produced. The steady noise is amplified by the differential amplifier 222. Such "steady noises" based on (Sa) and (Sb) exist on any two sensor conductors connected by a differential amplifier, and thus it may be said that similar differentials to (Sa)–(Sb) are being amplified by any of the differential amplifiers connecting sensor conductors in the system. The result is various amplified steady noises that, although steady over time, are detected by the detector. The presence of these steady noises reduces the level of accuracy possible in detecting the user's finger's location.

The Mapping Solution

Figure 16:
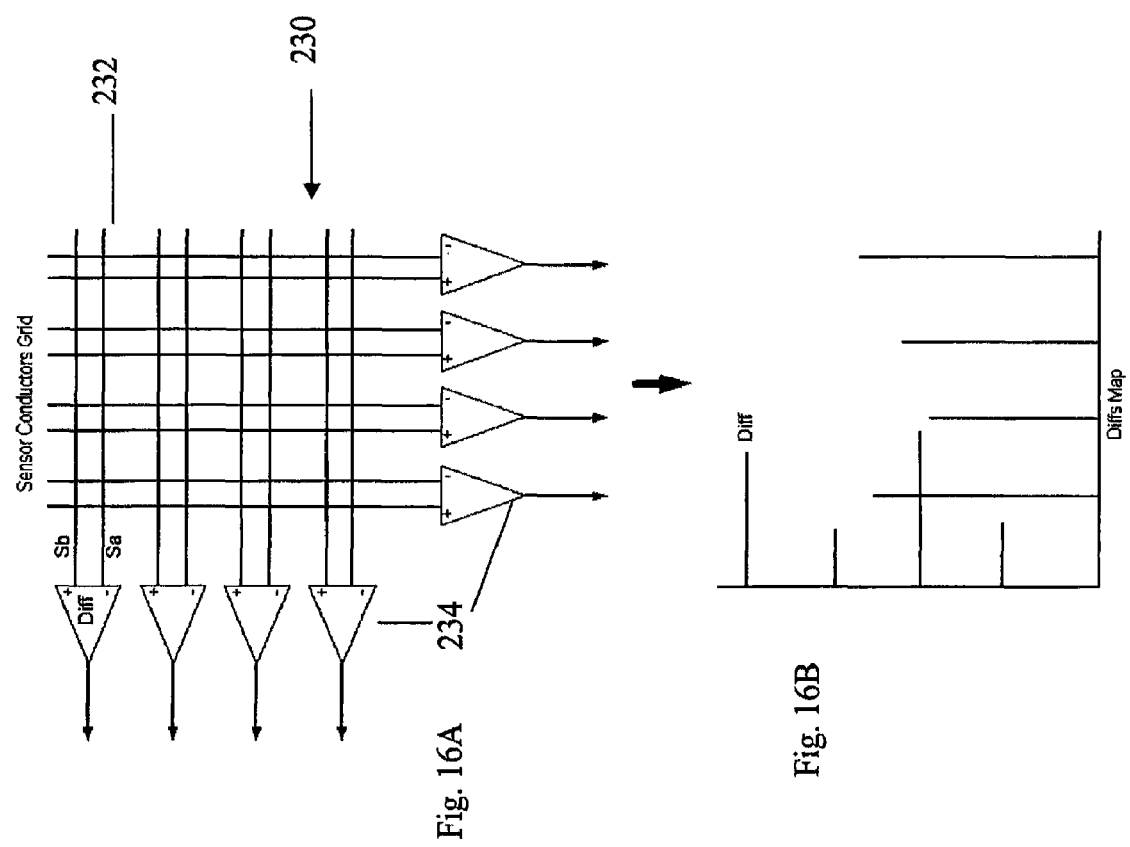
FIGS. 16A and 16B illustrate a grid of conductors and tabulation, both of magnitude and phase, of noise effects for the respective conductors.

Reference is now made to FIG. 16, which has an upper part 16A which shows the display panel as a grid 230 of sensor lines 232, each pair of sensor lines being connected to a differential amplifier 234. In one preferred embodiment of the present invention, the solution to the problem described above comprises mapping the various panel display amplified signal differentiations. As demonstrated in FIG. 16B, a value of steady noise is determined and mapped for each pair of sensor conductors. Such mapping is preferably achieved as follows:

(Sa) is the "steady noise" created on the sensor conductor connected to the positive side of the amplifier by the flat panel display. (Sb) is the "steady noise" created on a second conductor connected to the negative side of the amplifier by the flat panel display. A diff amplifier connects these two conductors. The differentiation between (Sa) and (Sb) is amplified by the diff amplifier.

1. The amplified signal is converted by A/D to a digital representation

2. The DSP performs FFT/DFT on the digital signal

3. Actions 1-3 are repeated for a predetermined number of times (for example 20 times). Averaging is then performed. Averaging minimizes variable noises that may provide temporary distortions of the measurement. The average value is then stored in the differential map.

4. Actions 1-4 are performed for each pair of conductors connected by a diff amplifier.

The result is a map, referred to herein as a differential map, and represented by FIG. 16B which includes both the magnitude and the phase of the differential signals recorded for each sensor pair. Each recorded magnitude phase pair represents the display panel "steady noise" of each pair of sensor conductors connected by a differential amplifier. The magnitude and phase are for a specific oscillation frequency.

In a preferred embodiment, the system uses a single frequency for detection of fingers. However, in additional embodiments, more than one frequency could be used and the system may switch between the frequencies or even oscillate at more than one frequency simultaneously. If more than one frequency is being used, than more than one map is created. Preferably one map is created for each frequency.

Figure 17:
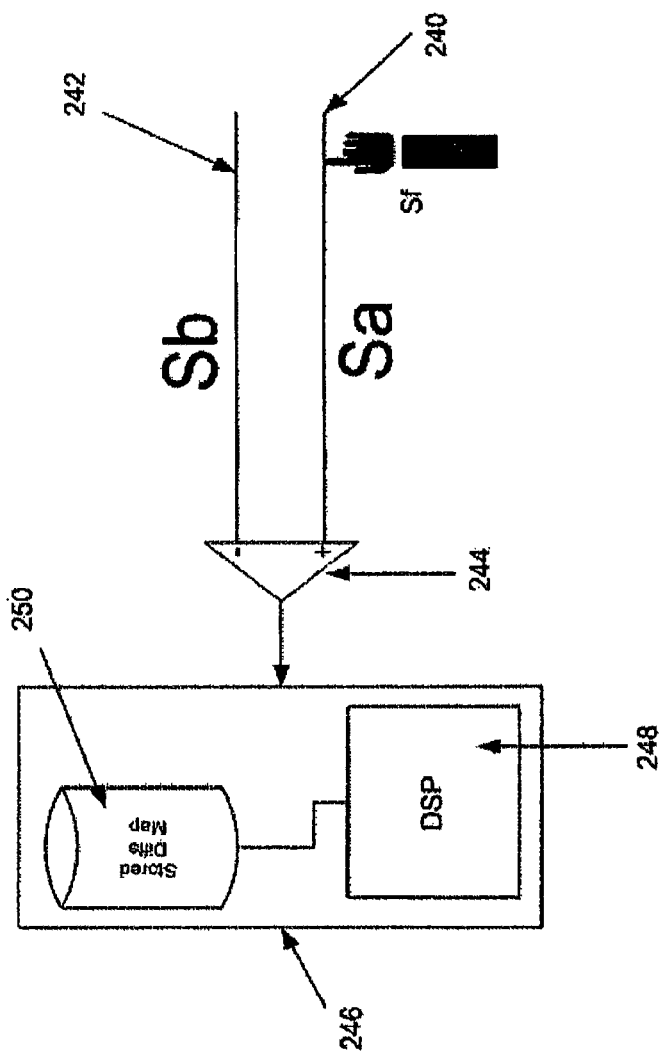
FIG. 17 is a block diagram of touch detection apparatus able to use the tabulation of FIG. 16B in order to correct touch readings.

Once the differential map is stored in memory, it can be used to compensate for the display panel signal steady noise phenomenon. Reference is now made to FIG. 17 which is a simplified schematic diagram illustrating a two-conductor sensor arrangement exhibiting the steady noise phenomenon. The display panel creates "steady noises" (Sa) and (Sb) on sensor conductors 240 and 242 respectively. The user's finger creates an (Sf) signal, which is the signal it is desired to measure. The overall differential, as determined by differential amplifier 244, between the sums of signals on both sensor conductors is: $\{(Sa)+(Sf)\}-(Sb)\}$ The overall differential is amplified by the diff amplifier 244 and sampled by the detector 246. The DSP component 248 reads the differentiation $\{(Sa)-(Sb)\}$ stored within the differential map 250. The DSP 250 subtracts the differential from the sampled signal. As $\{(Sa)+(Sf)\}-(Sb)\}-\{(Sa-Sb)\}=(Sf)$ the DSP is able to isolate and identify the finger signal, and identify the finger's location.

Such a mapping process is used in the preferred embodiment of the present invention in order to solve the problem of steady noises injected by the panel display. The same method can be used in the same and other embodiments of the present invention in order to solve any type of steady noise problem. Examples of potential sources for steady noise include: differences in input impedance, differences in input capacitance, insufficient common mode rejection, etc.

Detection of Signaling Objects Through the Mapping Process Problem and its Solutions The mapping process creates the following problem:

An object, usually a finger, a hand or combination of fingers and hands, placed on the display panel during the mapping process creates a signal. When the hand is removed a difference over the values initially stored within the differential map is created. Such a difference may be mistaken by the DSP 248 for a relevant signal such as a finger signal.

For simplicity of explanation the opposite case is taken: a user's finger may be placed on the display panel during the actual mapping process. The finger inputs a signal (F1s) to a sensor conductor 242 as before. The sensor conductor also receives a steady noise signal (D1s) from the display panel. Another sensor conductor 240 receives a steady noise signal (D2s) from the display panel. These two sensor conductors are connected to the same diff amplifier 244. The differential received and amplified by the diff amplifier equals $\{(D1s)+(F1s)\}-(D2s)$. Some time after the mapping process is over, the finger is removed. The new differential amplified is now equal to: $(D1s)-(D2s)$. The DSP subtracts the value stored in the differential map from the new value. The result equals: $\{(D1s)-(D2s)\}-[\{(D1s)+(F1s)\}-(D2s)]=-(F1s)$. Realistically, the (F1s) value represent the magnitude, and the (−) sign represents the phase. This result is exactly the differentiation expected when a finger is placed on the second sensor conductor and assuming that a finger had not been placed on the first sensor conductor during the mapping process. The DSP responds as if a finger was detected, although no finger is actually placed on the display panel.

One embodiment of the present invention utilizes the embodiment described above where the mapping process is performed once during the manufacturing process. As the expected signaling objects creating the detection of signaling objects through the mapping process problem explained above are mostly a user's finger, fingers, palm, fist etc; and as the manufacturing environment is one where no user is present, the problem is solved.

The disadvantage of the above approach is the reliability of a single mapping process. Due to system's mobility, temperature changes, mechanical changes, etc, the differentiation between the signals produced by the display panel on any two sensor conductors connected by a differential amplifier may change over time, rendering previously recorded differential map values obsolete. A strictly controlled manufacturing process may solve the disadvantage by ensuring that no such changes occur, but such a process increases costs. On the other hand it is reasonable to believe that extreme changes in environmental conditions will not occur during a single operation cycle of the system (i.e. from turning on the computer until shutting it down). Hence, initializing the mapping process upon system initialization should suffice in most cases.

One embodiment of the present invention comprises performing mapping during each system initialization. During the initialization the user may be warned, either by a caption on the display panel or in any other manner, not to touch the display panel. As the expected signaling objects are typically the user's finger, fingers, palm, fist etc, this warning solves the problem. In a variation, not only is mapping carried out at each initialization but again at every time there is a doubt regarding the validity of the differential map. Methods designated to identify such doubts are described hereinbelow.

Methods of Identifying Doubts in the Validity of the Differential Map

In one preferred embodiment of the present invention, simultaneous identification of more than a single finger's pattern is utilized in order to identify a doubt in the validity of the differential map.

Thus, whenever the DSP simultaneously detects more then a single finger's signal pattern, a doubt in the validity of the differential map is inferred, and the DSP launches a new mapping process.

Figure 18:
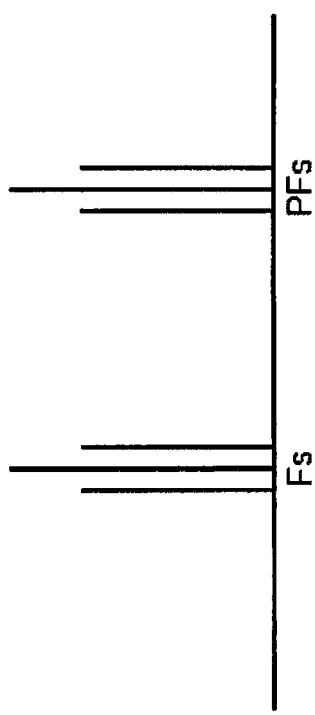
FIG. 18 is a simplified diagram illustrating signal patterns indicative of finger touches.

Reference is now made to FIG. 18 with which an example of such a procedure is described. Two groups of three lines are shown, a first group labeled Fs and a second group labeled PFs. Each line represents two sensor conductors connected to the same differential amplifier. The lines represent sensor conductor axial signal detection, preferably after subtracting the steady noise from whatever source, such as the display panel steady noise, as explained above. The height of each line represents the signal's magnitude. (Fs) and (PFs) are finger signal patterns. If the user places a finger on the display panel during the mapping process, then a finger signal pattern (PFs) is detected only once the finger is removed, as explained above. Once the user actually places a finger, another finger signal pattern (Fs) is detected. Once two finger signal patters are detected on the same axis a doubt in the validity of the differential map occurs, and the DSP launches a new mapping sequence.

It is noted that the same method can be used to identify not only more then one finger but also one single object that is larger than a finger, such as a fist or a palm. The detection of such an object's signal pattern immediately raises doubts regarding the validity of the differential map.

One disadvantage of the above described method of reinitializing in the face of a doubt is that it may enter an endless cycle of reinitializing. Thus, in the example explained in FIG. 18, the new mapping process is launched, but the finger that created signal pattern (Fs) in the first place is still in place on the display panel, damaging the validity of any reinitializing carried out at this point.

An additional disadvantage is that such a system may be used solely in systems capable of single finger detection. Once a system is designed to detect more than a single touch, then multiple touch is a totally legitimate input signal and cannot be taken as an indication that reinitializing is required.

In another preferred embodiment of the present invention the detector identifies doubts in the validity of the differential map by utilizing the signal's phase information. As explained above, the phase of a signal caused by a "pseudo" finger is opposite (180 degree) to the phase of a signal caused by a real finger placed in the same position. Therefore, in a preferred embodiment, the system identifies doubts by detecting contradictions between phase and position. However, since a differential amplifier has two inputs, negative and positive, a real finger located on the other input of the amplifier can lead to an opposite phase as well. Therefore, in order to avoid ambiguity, the system detects the position of the finger without using phase information.

Such a method is described in U.S. provisional patent application 60/406,662, in which the amplifier input (negative or positive) is determined using the magnitude of signals received by the neighbor conductors.

The method is further explained as follows: If the user places a finger on the display panel during the mapping process, and then removes it, a finger signal pattern is detected as explained above. This method differentiates such a signal pattern from an actual finger that is placed on the display panel in the following manner: Sometime after the mapping process, a given differential amplifier amplifies a differential in the signals of the two conductors it connects. This differentiation's pattern fits the magnitude of a finger's pattern.

The pattern is the result of the following scenarios:
1. A user's finger has been placed on the display panel through the mapping process. The finger has sent a signal through the sensor conductor connected to the positive input of the differential amplifier, and, as a result, a signal (F1$s$) is sent to the differential amplifier (N). The sensor conductor also receives a steady noise signal (D1$s$) from the display panel. The sensor conductor connected to the negative input of the differential amplifier receives a steady noise signal (D2$s$) from the display panel. The differential consequently received and amplified by the differential amplifier equals $\{(D1s)+(F1s)\}-(D2s)$. The finger is now removed. The differential signal amplified upon removal of the finger now equals $\{(D1s)-(D2s)\}$. The DSP now subtracts the value stored in the differential map from the new value. The result equals $\{(D1s)-(D2s)\}-[\{(D1s)+(F1s)\}-(D2s)]=-(F1s)$. Realistically, the (F1$s$) value represent the magnitude, and the (−) sign represents the phase shift.
2. The pattern (magnitude and phase) is the result of a real finger currently sending a signal through the sensor conductor connected to the negative input of the differential amplifier.

By using the magnitude of signals received and the neighboring conductors method disclosed in subchapter 4.6 of U.S. provisional patent application 60/406,662, which subchapter is hereby incorporated by reference, the DSP detects whether the source is the negative input of the differential amplifier or the positive input thereof.

If the signal's source was the sensor conductor connected to the positive input of the differential amplifier then scenario number 1 appears to be the case and the differential map is not valid. A new mapping process or initialization is launched.

If the signal's source was the sensor conductor connected to the negative input of the differential amplifier then scenario number 1 mentioned above did not happen and the mapping is valid. The DSP consequently detects a finger.

This method functions in an identical manner when the two options are:
1. A finger was sending a signal through the sensor conductor connected to the negative input of the differential amplifier, and has now been removed.
2. A finger is currently sending a signal through the sensor conductor connected to the positive input of the differential amplifier.

In order to increase the reliability of the detection of doubts in the mapping, either while using phase information or while using any other method, the system may limit the initialization of re-learning steady noises only to cases in which such doubts are presented for at least a predetermined minimum duration of time. Since the signals created by a pseudo finger are steady and never change over time, stability over time is an additional differentiation factor between real and pseudo signals.

In one preferred embodiment of the present invention the signal induced by the finger is much larger then the steady noise signals. This ensures that a finger presence is always distinguished from the steady noise, hence enabling correct mapping process. For example, returning to FIG. 15, when capacitors 216 and 218 are of lower capacitances then the finger induced capacitance—a signal created by a finger touch is greater then the differential signal originating from capacitors 216 and 218. Hence, the steady noise originating from the coupling of the sensor array and the display screen cannot be mistaken for a finger touch. Any detected signals are translated into finger touch only when the received signal is considerably higher then the steady noise. Under these conditions, it is quite simple to identify a situation in which no fingers are present on the sensor plane to create a correct differential map.

One possibility for creating such conditions is ensuring an air gap between the conductive lines of the sensor and the display screen. The existence of an air gap in such a location reduces the coupling capacitance between the sensor lines and the display screen to such a level that finger signals are much greater then the steady noise. Another possibility comprises placing the sensor plane in close proximity to the user finger, thus ensuring that the finger induced signal is greater then the steady noise.

Figure 19:
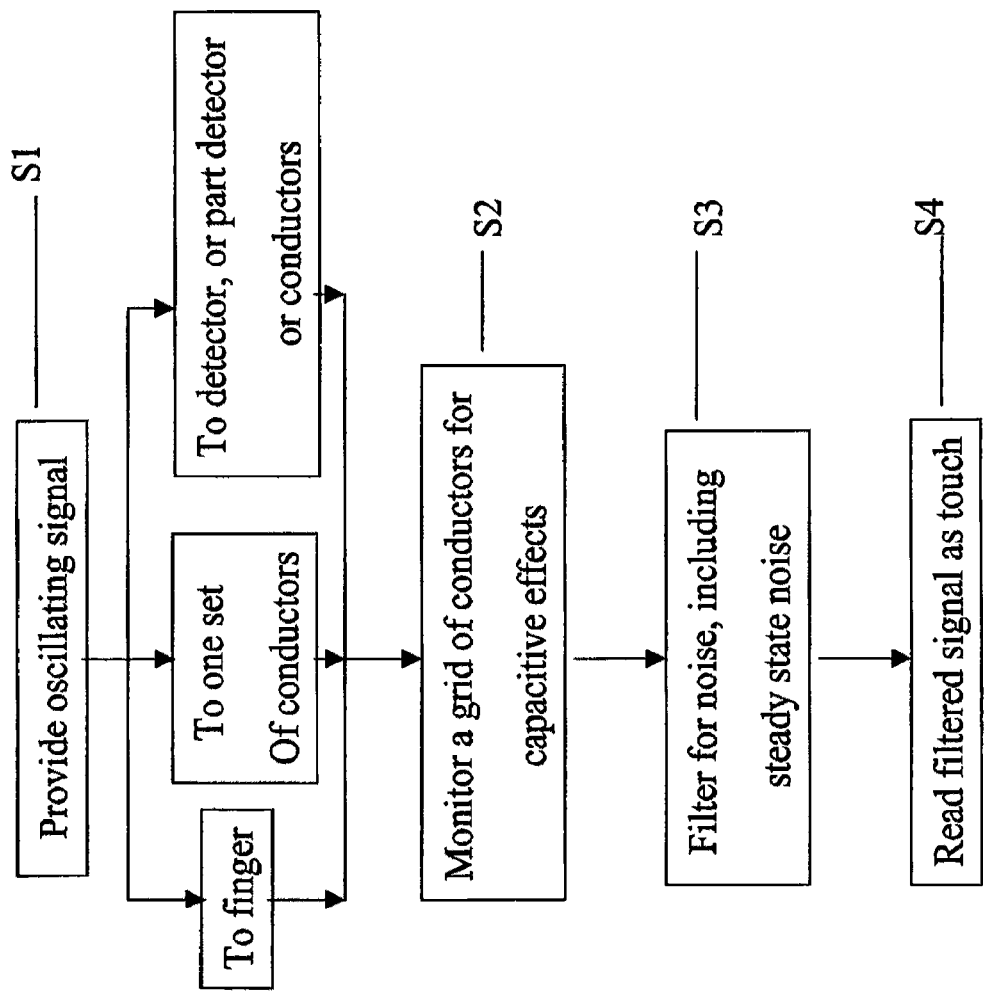
FIG. 19 is a simplified flow chart illustrating touch measuring procedures according to the present invention.

Reference is now made to FIG. 19, which is a simplified flow chart summarizing the three principle embodiments of the present invention. In FIG. 19, a stage 1 involves providing an oscillating electrical signal. In one embodiment the oscillating signal is transmitted, so as to be picked up by the finger etc doing the touching. In a second embodiment the oscillating signal is provided to one of the two groups of conductors. The oscillating signal is capacitively connected to the second group of conductors in the presence of a finger touch but not otherwise. In the third embodiment the detection device or the conductors are floated with the oscillating signal and the finger touch provides an AC short to earth.

In stage S2, the capacitive effect is detected by monitoring of the conductors in the grid. Depending on the embodiment, the capacitive effect may be the signal from the finger, the signal connected from the other set of conductors, or the drop in voltage due to the AC short provided by the finger connection. In other embodiments, any other capacitive effect may be used.

In stage S3 the signal is filtered. Depending on the embodiment the filtering stage may take on different forms, some of which are discussed in detail above. In stage S4 the filtered signal is used to identify where on the grid a touch has occurred.

It is expected that during the life of this patent many relevant imaging devices and systems will be developed and the scope of the terms herein, particularly of the terms "stylus" and "transparent conductive material", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A detector for providing position detection of a first kind of user interaction together with position detection of a second kind of user interaction, the detector comprising:
   a sensor,
   a patterned arrangement of sensing conductors extending within said sensor, and
   detection circuitry associated with said arrangement for detecting signals at same sensing conductors arising from said position detection of a first kind of user interaction and signals arising from said position detection of a second kind of user interaction, therefrom to detect positions at said sensor.

2. The detector of claim 1, wherein said position detection of a first kind of user interaction comprises electromagnetic-based object detection of an object able to produce an electromagnetic signal.

3. The detector of claim 2, comprises an excitation circuitry for providing an oscillating excitation signal capable of exciting said object, and wherein said object comprises a resonance circuit, and wherein said excitation signal is adapted to excite said resonance circuit, and said detection circuitry is adapted for detecting signals from said object at, at least one of the sensing conductors.

4. The detector of claim 2, wherein said object is a stylus.

5. The detector of claim 1, wherein said detection circuitry is capable of detecting interactions of said first kind of user interaction and said interactions of said second kind of user interaction simultaneously.

6. The detector of claim 1, wherein said detection circuitry is capable of detecting interactions of said first kind of user interaction and said interactions of said second kind of user interaction independently.

7. The detector of claim 1, wherein said sensor is substantially transparent and suitable for mounting over a display screen.

8. The detector of claim 1, wherein said detection circuitry comprises a differential detector arrangement associated with said sensing conductors for detecting differences between output signals at said conductors.

9. The detector of claim 8, wherein said sensing conductors are connected pairwise to differential amplifiers each having a positive input and a negative input, and wherein a first sensing conductor of said pair is connected to said positive input and a second sensing conductor of said pair is connected to said negative input.

10. The detector of claim 1, wherein said detection circuitry is configured for sensing a signal at, at least one of the sensing conductors induced by a touch of a conductive object.

11. The detector of claim 10, wherein said detection circuitry is adapted to detect a signal at said at least one sensing conductor for interpretation as a number of touching objects.

12. The detector of claim 1, wherein said position detection of a first kind of user interaction comprises electromagnetic-based object detection of multiple objects, each of the objects able to produce an electromagnetic signal.

13. The detector of claim 1, wherein said sensor comprises a matrix of first sensing conductors aligned in a first direction and second sensing conductors aligned in an orthogonal direction and said matrix of sensing conductors arranged within at least one layer.

14. The detector of claim 1 wherein said position detection of a first kind comprises capacitive-based touch detection, wherein said touch is a touch by a body part.

15. A method for providing position detection of a first kind of user interaction together with position detection of a second kind of user interaction, the method comprising:
   providing a sensor including a patterned arrangement of sensing conductors;
   detecting signals arising from said position detection of said first kind of user interaction and said second kind of user interaction at same sensing conductors; and
   detecting position of said first kind of user interaction and said second kind of user interaction from said signals.

16. The method of claim 15, wherein said position detection of a first kind of user interaction comprises electromagnetic-based object detection of an object able to produce an electromagnetic signal.

17. The method of claim 16, wherein said object is a stylus.

18. The method according to claim 16 comprising:
   providing an excitation signal capable of exciting said object, and
   detecting signals from said object at least one of the sensing conductors.

19. The method according to claim 18, wherein said object comprises a resonance circuit, and said excitation signal is adapted to excite said resonance circuit.

20. The method of claim 15, wherein said position detection of a first kind of user interaction comprises capacitive-based touch detection.

21. The method according to claim 20 comprising:
   providing an oscillating electrical signal; and
   detecting a capacitive influence on at least one sensing conductor when said oscillating electrical signal is applied.

22. The method according to claim 21 comprising interpreting a property of the signals detected at, at least one sensing conductor in terms of a number of touching conductive objects.

23. The method according to claim 21, wherein said oscillating electrical signal is provided to at least one sensing conductor, said oscillating electrical signal oscillates with respect to a reference voltage level, thereby to permit a capacitive current flow between a touching object and said at least one sensing conductor.

24. The method according to claim 21, wherein said oscillating electrical signal is provided to an external transmitter to energize a touching capacitive object.

25. The method of claim 15, wherein said position detection of a first kind of user interaction comprises electromagnetic detection of an object able to produce an electromagnetic field and said position detection of a second kind of user interaction comprises capacitive-based touch detection.

26. The method of claim 15, wherein the detecting signals arising from said position detection of said first kind of user interaction and said second kind of user interaction is performed simultaneously.

27. The method of claim 15 wherein the detecting signals arising from said position detection of said first kind of user interaction and said second kind of user interaction is performed independently.

28. The method according to claim 15, wherein said sensor comprises a matrix of first sensing conductors aligned in a first direction and second sensing conductors aligned in an orthogonal direction and where the matrix is arranged within at least one layer thereof.

29. The method according to claim 28, comprising:
providing an oscillating electrical signal to at least one sensing conductor in said first direction; and
detecting a resulting signal at least one sensing conductor in said orthogonal direction, wherein said resulting signal is caused by a touch of an object.

* * * * *